(12) United States Patent
Kim et al.

(10) Patent No.: US 10,817,640 B2
(45) Date of Patent: Oct. 27, 2020

(54) INTEGRATED CIRCUIT INCLUDING DIFFERENT TYPES OF CELLS, AND METHOD AND SYSTEM OF DESIGNING THE SAME

(71) Applicant: SAMSUNG ELECTRONICS CO., LTD., Suwon-si, Gyeonggi-Do (KR)

(72) Inventors: Jae-Hoon Kim, Seoul (KR);
Yong-Durk Kim, Hwaseong-si (KR);
Woo-Tae Kim, Seoul (KR);
Hyung-Ock Kim, Seoul (KR);
Joon-Young Shin, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/420,721

(22) Filed: May 23, 2019

(65) Prior Publication Data
US 2020/0151298 A1    May 14, 2020

(30) Foreign Application Priority Data
Nov. 9, 2018  (KR) .................. 10-2018-0137000

(51) Int. Cl.
*G06F 30/392* (2020.01)
*G06F 30/394* (2020.01)
*G06F 119/18* (2020.01)

(52) U.S. Cl.
CPC .......... *G06F 30/392* (2020.01); *G06F 30/394* (2020.01); *G06F 2119/18* (2020.01)

(58) Field of Classification Search
CPC .............................. G06F 30/392; G06F 30/394
See application file for complete search history.

(56) References Cited

U.S. PATENT DOCUMENTS

| | | | |
|---|---|---|---|
| 6,446,248 B1 | 9/2002 | Solomon et al. | |
| 7,444,609 B2 | 10/2008 | Charlebois et al. | |
| 9,047,433 B2 | 6/2015 | Yang et al. | |
| 9,123,721 B2 | 9/2015 | Samadi et al. | |
| 10,146,900 B2 * | 12/2018 | Sahu | G06F 30/39 |
| 10,236,302 B2 * | 3/2019 | Correale, Jr. | H01L 27/0886 |
| 2014/0327146 A1 * | 11/2014 | Deng | G06F 30/392 |
| | | | 257/774 |

(Continued)

*Primary Examiner* — Stacy Whitmore
(74) *Attorney, Agent, or Firm* — F. Chau & Associates, LLC

(57) ABSTRACT

A method of generating an integrated circuit design includes receiving input data defining input cells of the integrated circuit design, selecting first standard cells from a first standard cell library to represent the input cells having a first characteristic, selecting second standard cells from a second standard cell library to represent the input cells having a second characteristic different from the first characteristic, and generating output data representing the integrated circuit design by performing placement and routing on the selected first standard cells and the selected second standard cells. The first standard cell library includes a first type of standard cells manufactured using a first diffusion break scheme. The second standard cell library includes a second type of standard cells manufactured using a second diffusion break scheme. Each of the second type of standard cells has a same function as a respective one of the first type of standard cells.

19 Claims, 20 Drawing Sheets

(56) References Cited

U.S. PATENT DOCUMENTS

| | | | |
|---|---|---|---|
| 2016/0085898 A1* | 3/2016 | Manohar | G06F 30/394 |
| | | | 716/124 |
| 2016/0117431 A1* | 4/2016 | Kim | G06F 30/392 |
| | | | 716/119 |
| 2017/0083653 A1* | 3/2017 | Sahu | H01L 27/0207 |
| 2017/0336845 A1* | 11/2017 | Raj | G06F 1/28 |
| 2017/0371995 A1* | 12/2017 | Correale, Jr. | G06F 30/39 |
| 2017/0373090 A1* | 12/2017 | Correale, Jr. | H01L 27/0207 |
| 2018/0006035 A1 | 1/2018 | Yuan et al. | |
| 2018/0068907 A1 | 3/2018 | Kim et al. | |
| 2018/0096092 A1 | 4/2018 | Kim et al. | |
| 2018/0210421 A1 | 7/2018 | Kim et al. | |
| 2018/0365368 A1* | 12/2018 | Do | H01L 27/11807 |
| 2019/0255749 A1* | 8/2019 | Moriizumi | B60K 37/00 |
| 2019/0268000 A1* | 8/2019 | Song | H01L 27/0924 |
| 2020/0004917 A1* | 1/2020 | Ku | G06F 30/398 |
| 2020/0020728 A1* | 1/2020 | Ammo | H01L 27/092 |
| 2020/0057830 A1* | 2/2020 | Azmat | G06F 30/327 |
| 2020/0076436 A1* | 3/2020 | Song | G06F 30/3953 |

* cited by examiner

INTEGRATED CIRCUIT INCLUDING DIFFERENT TYPES OF CELLS, AND METHOD AND SYSTEM OF DESIGNING THE SAME

CROSS-REFERENCE TO RELATED APPLICATION

This U.S. non-provisional patent application claims priority under 35 USC § 119 to Korean Patent Application No. 10-2018-0137000, filed on Nov. 9, 2018 in the Korean Intellectual Property Office (KIPO), the disclosure of which is incorporated by reference in its entirety herein.

BACKGROUND

1. Technical Field

Exemplary embodiments relate generally to semiconductor integrated circuits, and more particularly to designs (e.g., layouts) of integrated circuits including different types of cells, methods of generating the integrated circuit designs and design systems for generating the integrated circuit designs.

2. Discussion of Related Art

Standard cells having fixed functions may be used in the generating of integrated circuit designs. The standard cells are designed to have predetermined architectures and are stored in cell libraries. When generating integrated circuit designs, the standard cells are retrieved from the cell libraries and placed into desired locations on an integrated circuit layout. Routing is then performed to connect the standard cells with each other and with other cells. For example, metal routing wires may be used to connect the standard cells and the other cells, to route signals between the standard cells and the other cells. The predetermined architecture of a standard cell may include a cell width, a cell height, a power rail width, positions and numbers of pin points, etc. Standard cells having the same function but different performances and areas (e.g., different types of standard cells) may exist. Since the standards cells having the same function have different areas, they have different cell boundaries, and accordingly different cell boundary locations when placed on an integrated circuit layout. However, due to the differing cell boundary locations, processes for performing self-aligned double patterning cannot be used in combination with existing placement and routing schemes that perform automatic placement of cells based on cell boundary. In particular, due to the differing cell boundary locations, a vertical alignment of such placed cells is not possible. Accordingly, it is not possible to place standard cells having the same function and different areas and/or performances in a single integrated circuit design.

SUMMARY

At least one exemplary embodiment of the present disclosure provides a method of generating an integrated circuit design capable of including different types of standard cells in one integrated circuit, and an integrated circuit can then be manufactured using the integrated design.

At least one exemplary embodiment of the present disclosure provides an integrated circuit design capable of including different types of standard cells, and an integrated circuit that can then be manufactured using the integrated design.

At least one exemplary embodiment of the present disclosure provides a design system for generating an integrated circuit design capable of including different types of standard cells in one integrated circuit design, and an integrated circuit that can then be manufactured using the integrated design.

According to an exemplary embodiment of the inventive concept, a method of generating an integrated circuit design includes receiving input data defining input cells of the integrated circuit design, selecting first standard cells from a first standard cell library to represent the input cells having a first characteristic, selecting second standard cells from a second standard cell library to represent the input cells having a second characteristic different from the first characteristic, and generating output data representing the integrated circuit design by performing placement and routing on the selected first standard cells and the selected second standard cells. The first standard cell library includes a first type of standard cells manufactured using a first diffusion break scheme. The second standard cell library includes a second type of standard cells manufactured using a second diffusion break scheme. Each of the second type of standard cells has a same function as a respective one of the first type of standard cells. The second diffusion break scheme is different from the first diffusion break scheme. An integrated circuit may then be manufactured using the output data.

According to an exemplary embodiment of the inventive concept, a design system for generating an integrated circuit design includes a storage device and a processor. The storage device stores a placer module and a router module. The processor accesses the storage device to execute the modules. The placer module places at least one of a first type of standard cells and at least one of a second type of standard cells in the integrated circuit based on input data, a first standard cell library and a second standard cell library. The input data defines the integrated circuit design. The first standard cell library includes the first type of standard cells manufactured using a first diffusion break scheme. The second standard cell library includes the second type of standard cells manufactured using a second diffusion break scheme. Each of the second type of standard cells has a same function as a respective one of the first type of standard cells. The second diffusion break scheme is different from the first diffusion break scheme. The router module generates output data representing the integrated circuit design by routing connections of the at least one of the first type of standard cells and the at least one of the second type of standard cells placed in the integrated circuit design. An integrated circuit may then be manufactured using the output data.

According to an exemplary embodiment of the inventive concept, an integrated circuit design includes a first type of standard cells and a second type of standard cells. The first type of standard cells are manufactured using a first diffusion break scheme. The second type of standard cells are manufactured using a second diffusion break scheme. Each of the second type of standard cells has a same function as a respective one of the first type of standard cells. The second diffusion break scheme is different from the first diffusion break scheme.

In an integrated circuit design, a method of generating the integrated circuit design, and a design system for generating the integrated circuit design according to exemplary embodiments, the integrated circuit design may be generated and implemented such that different types of standard cells are included in one integrated circuit design. The different types of standard cells may have the same functions but may differ in manufacturing method, performance, and/or area. Various different types of standard cells may be implemented in one integrated circuit design by using various design optimization schemes, and thus an integrated circuit may be manufactured from the resulting integrated circuit having superior characteristics such as performance and area.

BRIEF DESCRIPTION OF THE DRAWINGS

Exemplary embodiments of the present disclosure will be more clearly understood from the following detailed description taken in conjunction with the accompanying drawings.

DETAILED DESCRIPTION OF THE EXEMPLARY EMBODIMENTS

Figure 1:
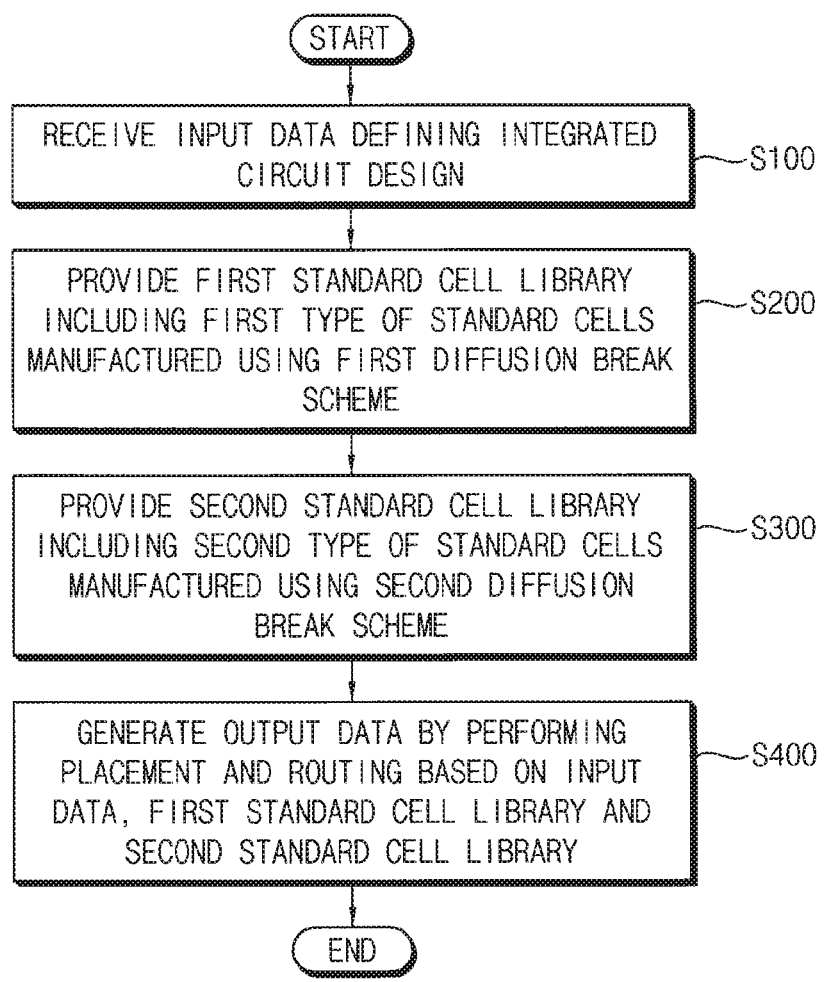
FIG. 1 is a flowchart illustrating a method of generating an integrated circuit design according to an exemplary embodiment of the inventive concept.

The inventive concept will be described more fully with reference to the accompanying drawings, in which embodiments thereof are shown. The present disclosure may, however, be embodied in many different forms and should not be construed as limited to the embodiments set forth herein. Like reference numerals refer to like elements throughout this application.

FIG. 1 is a flowchart illustrating a method of generating an integrated circuit design according to an exemplary embodiment of the inventive concept.

Referring to FIG. 1, a method of generating an integrated circuit design according to an exemplary embodiment may be a method for designing a layout of the integrated circuit and may be performed in a tool for designing the integrated circuit. For example, the tool for designing the integrated circuit may be a program including a plurality of instructions executed by a processor. The tool and the program will be described with reference to FIGS. 5 and 6.

In the method of generating the integrated circuit design according to an exemplary embodiment, input data defining the integrated circuit is received (step S100). An integrated circuit may be defined by a plurality of cells and may be designed using a cell library including information of the plurality of cells. Hereinafter, a cell may be a standard cell, and a cell library may be a standard cell library. In an exemplary embodiment, the standard cell is a group of transistors and interconnect structures that provides a Boolean logic function (e.g., AND, OR, XOR, XNOR, inversion) or a storage function (e.g., flipflop or latch).

In an exemplary embodiment, the input data is data generated from an abstract form with respect to behavior of an integrated circuit. For example, the input data may be defined in a register transfer level (RTL) through synthesis using the standard cell library. For example, the input data may be a bitstream or a netlist that is generated by synthesizing the integrated circuit design defined by a hardware description language (HDL) such as VHSIC hardware description language (VHDL) or Verilog.

In an exemplary embodiment, the input data may be data for defining the layout of the integrated circuit. For example, the input data may include geometric information for defining a structure implemented as a semiconductor material, a conductor (e.g., metal), and an insulator. A layer of the integrated circuit design indicated by the input data may have a layout of the cells and conducting wires used to connect a cell to other cells, for example.

A first standard cell library including a first type of standard cells is provided (step S200). The first type of standard cells are standard cells that are manufactured using or based on a first diffusion break scheme. The first type of standard cells will be described with reference to FIG. 2A.

A standard cell may refer to a unit of an integrated circuit in which a size of the layout meets a preset rule or criterion. The standard cell may include an input pin and an output pin and may process a signal received through the input pin to output a signal through the output pin. For example, the standard cell may include a basic cell such as an AND logic gate, an OR logic gate, a NOR logic gate, or an inverter, a complex cell such as an OR/AND/INVERTER (OAI) or an AND/OR/INVERTER (AOI), and a storage element such as a master-slave flip flop or a latch.

The first standard cell library may include information about a plurality of standard cells having the first type. For example, the first standard cell library may include a name and a function of a specific standard cell having the first type, as well as timing information, power information, and layout information of the specific standard cell having the first type. The first standard cell library may be stored in a storage device, and the first standard cell library may be provided by accessing the storage device.

A second standard cell library including a second type of standard cells is provided (step S300). The second type of standard cells are standard cells that are manufactured using or based on a second diffusion break scheme. The second type is different from the first type, and the second diffusion break scheme is different from the first diffusion break scheme. Each of the second type of standard cells has the same function as a respective one of the first type of standard cells. The second type of standard cells will be described with reference to FIG. 2B.

Various transistor devices that are formed on a layer (e.g., a substrate) of an integrated circuit must be electrically isolated from one another to properly function in an electrical circuit. This may be accomplished by forming a trench in the substrate, and filling the trench with an insulating material, such as silicon dioxide. These isolation regions may sometimes be referred to as diffusion breaks. The widths of the diffusion breaks and the number of cells each diffusion break overlaps may vary in different diffusion break schemes. One diffusion break scheme could include multiple diffusion breaks, where each diffusion break is formed to separate portions of the substrate into a pair of spaced apart active regions on which the cells are formed. When the width of a given diffusion break is less than or equal to a single cell, or is sized so that only a single cell can be disposed over that diffusion break, the given diffusion break may be referred to as a single diffusion break. For example, a left part of the first cell could be disposed on a first active region of the pair, a middle part of the first cell could be disposed on the single diffusion break, and a right part of the first cell could be disposed on a second active region of the pair. When the width of a given diffusion break is greater than a single cell and less than or equal to two cells, or is sized so that two cells can be disposed over that diffusion break, the given diffusion break may be referred to as a double diffusion break. For example, a left part of a first cell could be disposed on a first active region of the pair, a right part of a second cell could be disposed on a second active region of the pair, and the double diffusion break can overlap the remainder of the first and a second cells. A cell manufactured according to a given diffusion break scheme may use one or more of the above described diffusion breaks so that elements of the cell are properly spaced apart. Thus, elements of cells manufactured according to different diffusion break schemes could have different spacing within a given cell or an element of a first cell could have different spacing with respect to an element of a second cell that is placed adjacent to the first cell.

One of the standard cells having the first type and a corresponding one of the standard cells having the second type may have the same function but different performance and/or area. In other words, one target cell to be included and placed in the integrated circuit design may be implemented as one of the first type of standard cells having a specific function or a corresponding one of the second type of standard cells having the specific function.

The second standard cell library may include information about a plurality of standard cells having the second type. For example, the second standard cell library may include a name and a function of a specific standard cell having the second type, a name of a corresponding standard cell having the first type, as well as timing information, power information, and layout information of the specific standard cell having the second type. The second standard cell library may be stored in a storage device, and the second standard cell library may be provided by accessing the storage device.

Output data is generated by performing placement and routing based on the input data, the first standard cell library and the second standard cell library (step S400).

In some exemplary embodiments, when the received input data is data such as a bitstream or a netlist generated by synthesizing the integrated circuit design, the output data may also be the bitstream or the netlist. In other exemplary embodiments, when the received input data is data defining the layout of an integrated circuit, for example, data having a graphic data system II (GDSII) format, a format of the output data may also be data defining the layout of the integrated circuit.

According to at least one exemplary embodiment, different types of standard cells having the same function may be included and placed in an integrated circuit design representing a single integrated circuit. In other words, different types of standard cells may be applied to or employed within one integrated circuit design.

Figure 2A:
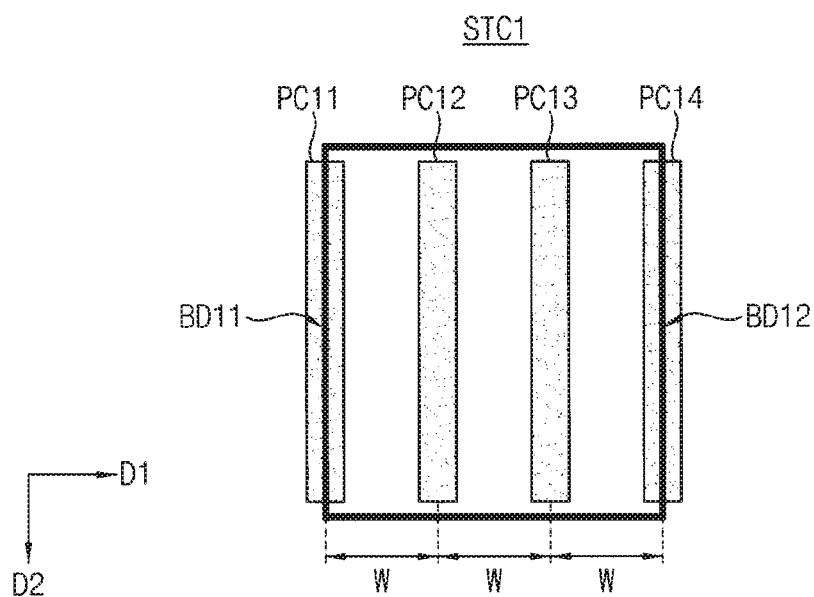
FIG. 2A is a layout diagram illustrating an example of a first type of standard cells included in an integrated circuit design according to an exemplary embodiment of the inventive concept.
Figure 2B:
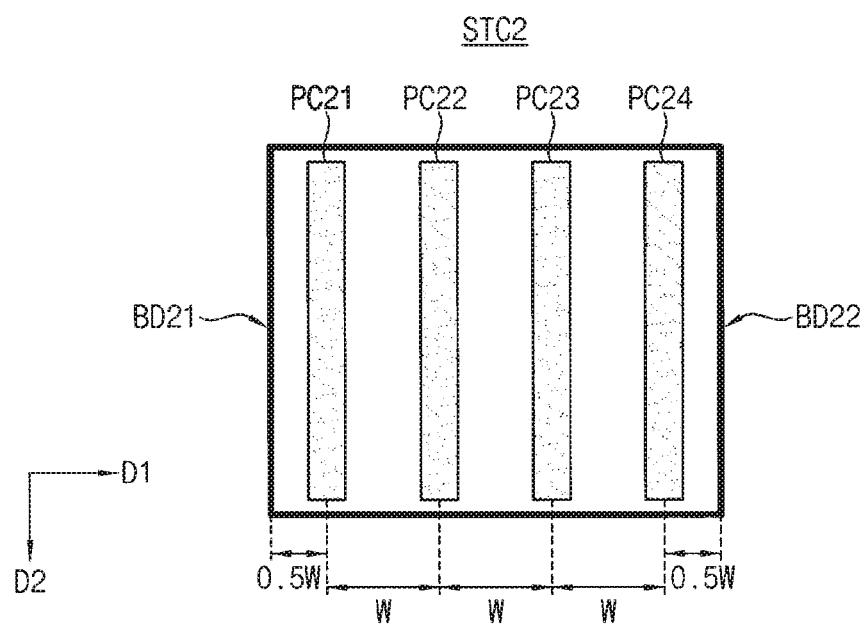
FIG. 2B is a layout diagram illustrating an example of a second type of standard cells included in an integrated circuit design according to an exemplary embodiment of the inventive concept.

FIG. 2A is a layout diagram illustrating an example of a first type of standard cells included in an integrated circuit design according to an exemplary embodiment of the inventive concept. FIG. 2B is a layout diagram illustrating an example of a second type of standard cells included in an integrated circuit design according to an exemplary embodiment of the inventive concept.

Referring to FIGS. 1 and 2A, when providing the first standard cell library including the first type of standard cells (step S200), a first standard cell STC1 having a first function may be provided as one of the first type of standard cells.

For example, as illustrated by a thick solid line in FIG. 2A, the first standard cell STC1 may be formed in a quadrangle (e.g., a rectangular shape) that includes two cell boundaries parallel to a first direction D1 and two cell boundaries BD11 and BD12 parallel to a second direction D2 crossing (e.g., perpendicular to) the first direction D1.

In addition, the first standard cell STC1 may be formed to include a plurality of first wirings PC11, PC12, PC13 and PC14 that are spaced apart from each other in the first direction D1 and separated by a first constant interval W internally. Each of the plurality of first wirings PC11, PC12, PC13 and PC14 may extend in the second direction D2. For example, the plurality of first wirings PC11, PC12, PC13 and PC14 may be gate lines. Although not illustrated in FIG. 2A, the first standard cell STC1 may further include wirings other than the plurality of first wirings PC11, PC12, PC13 and PC14, for example, power rails, routing grids or routing tracts which are formed over the first standard cell STC1, conductive contacts vertically connecting multi-layered wirings, or the like.

Referring to FIGS. 1 and 2B, when providing the second standard cell library including the second type of standard cells (step S300), a second standard cell STC2 having the first function (e.g., the same function as the first standard cell STC1) may be provided as one of the second type of standard cells.

For example, as illustrated by a thick solid line in FIG. 2B, the second standard cell STC2 may be formed in a quadrangle (e.g., a rectangular shape) that includes two cell boundaries parallel to the first direction D1 and two cell boundaries BD21 and BD22 parallel to the second direction D2.

In addition, the second standard cell STC2 may be formed to include a plurality of second wirings PC21, PC22, PC23 and PC24 that are spaced apart from each other in the first direction D1 and separated by a second constant interval W internally. Each of the plurality of second wirings PC21, PC22, PC23 and PC24 may extend in the second direction D2. The first constant interval W in FIG. 2A and the second constant interval W in FIG. 2B may be substantially equal to each other. For example, as with the first standard cell STC1, the plurality of second wirings PC21, PC22, PC23 and PC24 included in the second standard cell STC2 may be gate lines. Although not illustrated in FIG. 2B, the second standard cell STC2 may further include wirings other than the plurality of second wirings PC21, PC22, PC23 and PC24, for example, power rails, routing grids or routing tracts, conductive contacts, or the like.

In some exemplary embodiments, the first type for the first standard cell STC1 and the second type for the second standard cell STC2 may be classified or distinguished according to the characteristics of fabrication processes, e.g., the manufacturing schemes.

For example, the first diffusion break scheme for manufacturing the first standard cell STC1 may be a single diffusion break scheme. When the first standard cell STC1 is manufactured using the single diffusion break scheme, the cell boundaries BD11 and BD12 of the first standard cell STC1 may be formed using only the outermost two wirings PC11 and PC14 among the plurality of first wirings PC11, PC12, PC13 and PC14, and thus the outermost two wirings PC11 and PC14 among the plurality of first wirings PC11, PC12, PC13 and PC14 are positioned to overlap the cell boundaries BD11 and BD12 of the first standard cell STC1. For example, when the plurality of first wirings PC11, PC12, PC13 and PC14 are gate lines, the first wirings PC12 and PC13 on the inner side may be gate lines that are actually used, and the first wirings PC11 and PC14 on the outer side may be dummy gate lines.

The second diffusion break scheme for manufacturing the second standard cell STC2 may be a double diffusion break scheme. When the second standard cell STC2 is manufactured using the double diffusion break scheme, the cell boundaries BD21 and BD22 of the second standard cell STC2 may be formed using the outermost two wirings PC21 and PC24 among the plurality of first wirings PC21, PC22, PC23 and PC24 and further using two wirings which are adjacent to the outermost two wirings PC21 and PC24 and not included in the second standard cell STC2, and thus the outermost two wirings PC21 and PC24 among the plurality of first wirings PC21, PC22, PC23 and PC24 are positioned not to overlap the cell boundaries BD21 and BD22 of the second standard cell STC2.

In other words, the interval W between the first wirings PC11, PC12, PC13 and PC14 internally disposed in the first standard cell STC1 and the interval W between the second wirings PC21, PC22, PC23 and PC24 internally disposed in the second standard cell STC2 may be substantially equal to each other, however, an arrangement relationship between the cell boundaries BD11 and BD12 of the first standard cell STC1 and the first wirings PC11 and PC14 and an arrangement relationship between the cell boundaries BD21 and BD22 of the second standard cell STC2 and the second wiring PC21 and PC24 may be different from each other.

In some exemplary embodiments, the first type for the first standard cell STC1 and the second type for the second standard cell STC2 may be classified or distinguished according to the attributes of cells, e.g., performance and area.

For example, the first standard cell STC1 and the second standard cell STC2 may have the same function (e.g., the first function) as described above, however, the first standard cell STC1 and the second standard cell STC2 may be implemented for different boosting purposes. For example, the second standard cell STC2 may be implemented to have improved performance for performance boosting purposes as compared with the first standard cell STC1, the second standard cell STC2 may be formed by further inserting a specific front-end layer as compared with the first standard cell STC1, and thus the second standard cell STC2 may have a larger area than the first standard cell STC1. For example, assuming that the first standard cell STC1 and the second standard cell STC2 have the same cell height, the first standard cell STC1 may have a cell width of 3 W, the second standard cell STC2 may have a cell width of 4 W because a cell width of 0.5 W is added to each of the cell boundaries BD21 and BD22, and thus the area of the second standard cell STC2 may be larger than the area of the first standard cell STC1.

In other words, the second standard cell STC2 may be formed to have a relatively large area with improved performance, and the first standard cell STC1 may be formed to have a relatively small area with lower performance than the second standard cell STC2. Thus, the first type for the first standard cell STC1 may be referred to as an area oriented cell type, and the second type for the second standard cell STC2 may be referred to as a performance oriented cell type.

Figure 3:
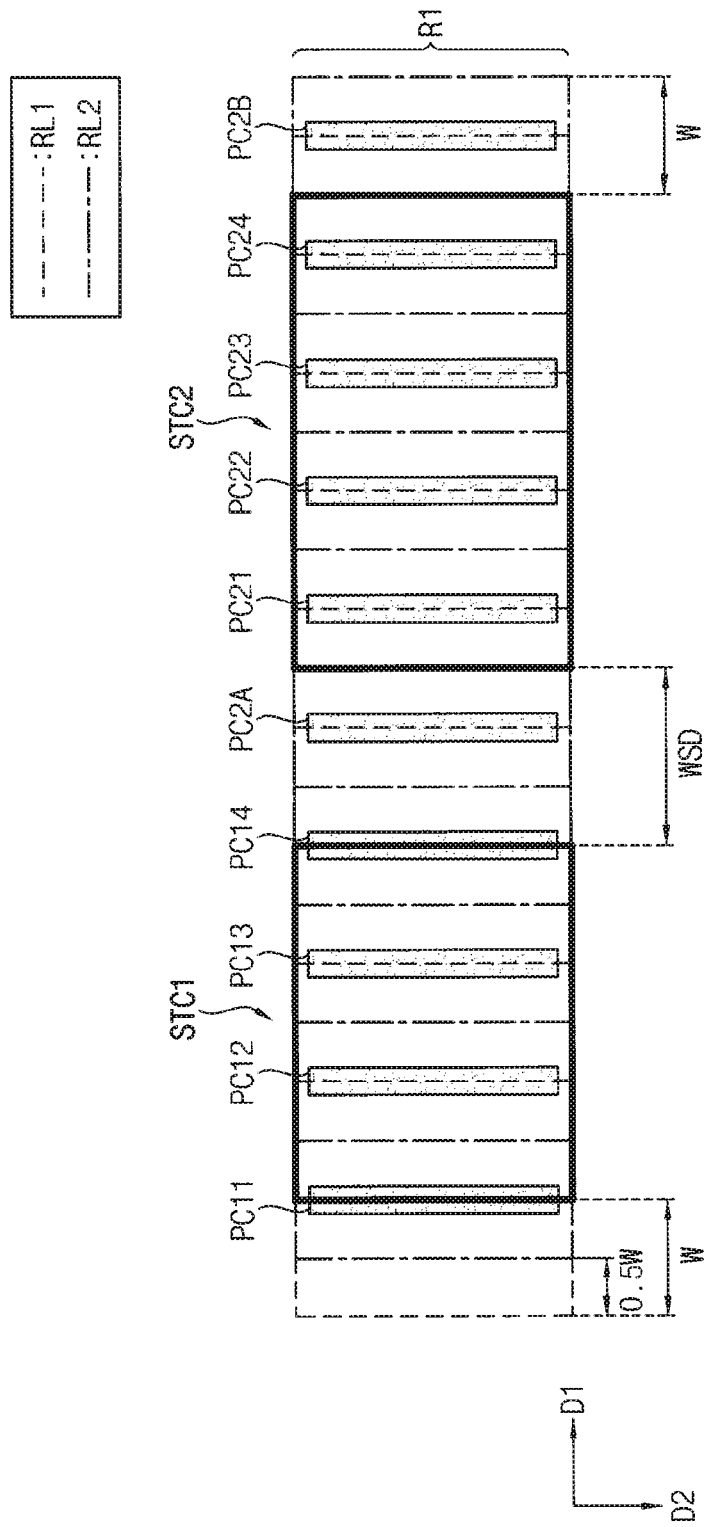
FIGS. 3 and 4 are diagrams illustrating an example of a layout of an integrated circuit according to an exemplary embodiment of the inventive concept.
Figure 4:
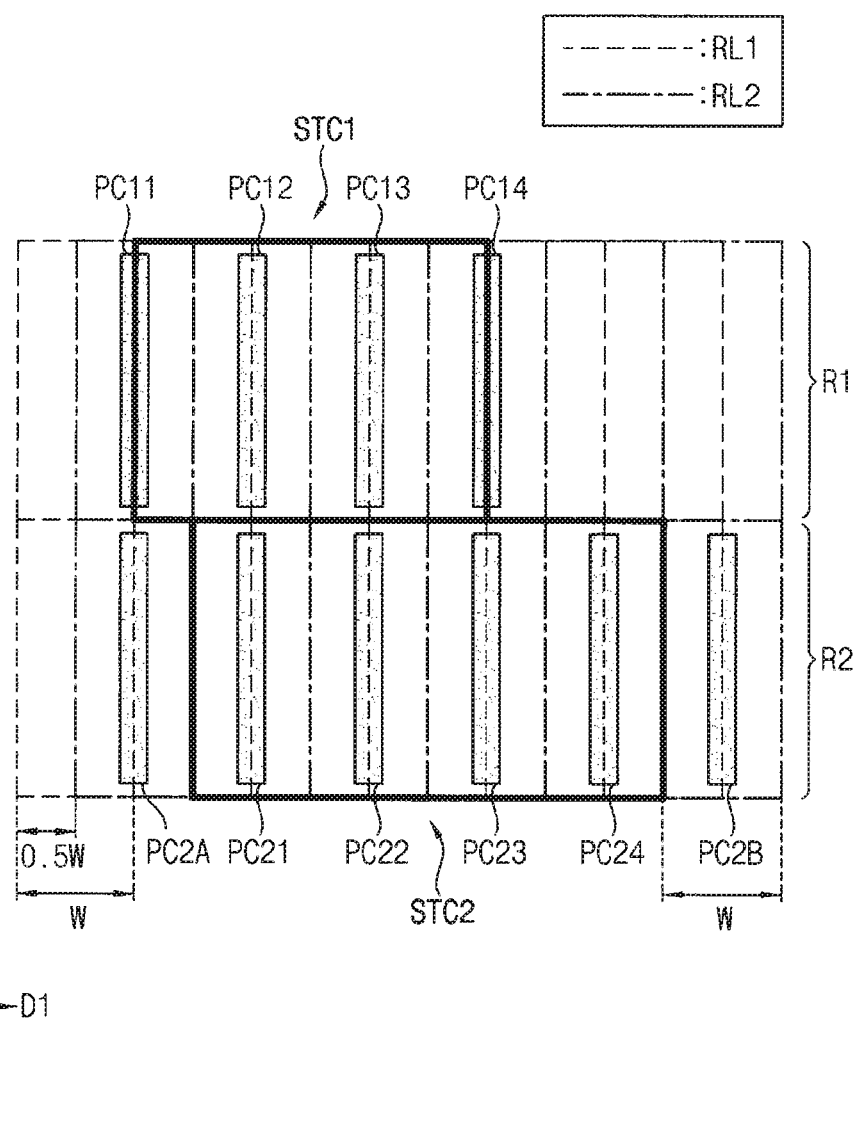

FIGS. 3 and 4 are diagrams illustrating an example of a layout of an integrated circuit according to exemplary embodiments of the inventive concept.

Referring to FIGS. 3 and 4, an integrated circuit design according to exemplary embodiments may substantially simultaneously or concurrently include one of the first type of standard cells (e.g., the first standard cell STC1) and one of the second type of standard cells (e.g., the second standard cell STC2) at one time. In other words, different types of standard cells may be placed or included in one integrated circuit or one circuit design. In addition, in the examples of FIGS. 3 and 4, the first standard cell STC1 and the second standard cell STC2 are illustrated as a single height cell arranged or placed to correspond to one row of the integrated circuit design.

In some exemplary embodiments, the first standard cell STC1 may be arranged or placed to correspond to a plurality of first reference lines RL1 in the integrated circuit design, and the second standard cell STC2 may be arranged or placed to correspond to a plurality of second reference lines RL2 in the integrated circuit design. Each of the plurality of first reference lines RL1 and the plurality of second reference lines RL2 extend in the second direction D2. The plurality of first reference lines RL1 may be spaced apart from each other in the first direction D1 and separated by a constant interval. The plurality of second reference lines RL2 may be spaced apart from each other in the first direction D1 and separated by a constant interval. Each of the plurality of second reference lines RL2 may be arranged between two adjacent first reference lines RL1. For example, an interval between two adjacent first reference lines RL1 and an interval between two adjacent second reference lines RL2 may be W, respectively, and an interval between one first reference line RL1 and one second reference line RL2 that are adjacent to each other may be 0.5 W.

When the first standard cell STC1 has the structure illustrated in FIG. 2A and the second standard cell STC2 has the structure illustrated in FIG. 2B, and when the first standard cell STC1 is arranged to correspond to the plurality of first reference lines RL1 and the second standard cell STC2 is arranged to correspond to the plurality of second reference lines RL2, all of the plurality of first wirings PC11, PC12, PC13 and PC14 included in the first standard cell STC1, the plurality of second wirings PC21, PC22, PC23 and PC24 included in the second standard cell STC2 and the other wirings PC2A and PC2B may be arranged to overlap the plurality of first reference lines RL1.

In an example of FIG. 3, the first standard cell STC1 and the second standard cell STC2 may be placed or arranged adjacent to each other in the same row (e.g., a row R1) of the integrated circuit design. In this example, the first standard cell STC1 and the second standard cell STC2 are spaced apart from each other by a distance greater than or equal to a predetermined reference distance WSD. For example, the reference distance WSD may be 1.5 W. In other words, when different types of standard cells are placed or arranged adjacent to each other in the same row, a white space zone having a minimum space equal to the reference distance WSD should exist between the different types of standard cells that are adjacent to each other in the same row, and both the first type of standard cells and the second type of standard cells are arranged in the white space zone.

In an example of FIG. 4, the first standard cell STC1 and the second standard cell STC2 may be placed or arranged adjacent to each other in different rows (e.g., rows R1 and R2) of the integrated circuit design. In this example, the first standard cell STC1 and the second standard cell STC2 do not need to be spaced apart from each other by the distance greater than or equal to the reference distance WSD. As described above, since the plurality of first wirings PC11, PC12, PC13 and PC14 and the plurality of first wirings PC21, PC22, PC23 and PC24 are arranged to overlap the plurality of first reference lines RL1, one of the plurality of first wirings PC11, PC12, PC13 and PC14 and one of the plurality of second wirings PC21, PC22, PC23 and PC24 may be positioned on the same straight line. For example, the first wiring PC12 and the second wiring PC21 may be positioned on the same straight line. In other words, at least some of the wirings PC11, PC12, PC13, PC14, PC21, PC22, PC23 and PC24 may be aligned along the second direction D2.

As described above, when the first standard cell STC1 is manufactured using the single diffusion break scheme, one cell boundary of the first standard cell STC1 may be formed using the first wiring PC11, and another cell boundary of the first standard cell STC1 may be formed using the first wiring PC14. When the second standard cell STC2 is manufactured using the double diffusion break scheme, one cell boundary of the second standard cell STC2 may be formed using the second wiring PC21 and the wiring PC2A adjacent to the second wiring PC21, and another cell boundary of the second standard cell STC2 may be formed using the second wiring PC24 and the wiring PC2B adjacent to the second wiring PC24.

Although FIGS. 3 and 4 illustrate examples where the first type of the first standard cell STC1 and the second type of standard cell STC2 that have the same function (e.g., the first function) are placed or arranged in the same row and in different rows of the integrated circuit design, exemplary embodiments of the inventive concept are not limited thereto. For example, exemplary embodiments may be applied to or employed within various examples where different types of standard cells are placed or included in an integrated circuit design of one integrated circuit, and the same type of standard cells may be arranged adjacent to each other as will be described with reference to FIG. 13B.

In addition, although FIGS. 3 and 4 illustrate examples where the first standard cell STC1 and the second standard cell STC2 are a single height cell, exemplary embodiments of the inventive concept are not limited thereto. For example, the integrated circuit design may include a multi height cell arranged or placed to correspond to two or more rows of the integrated circuit design.

Figure 5:
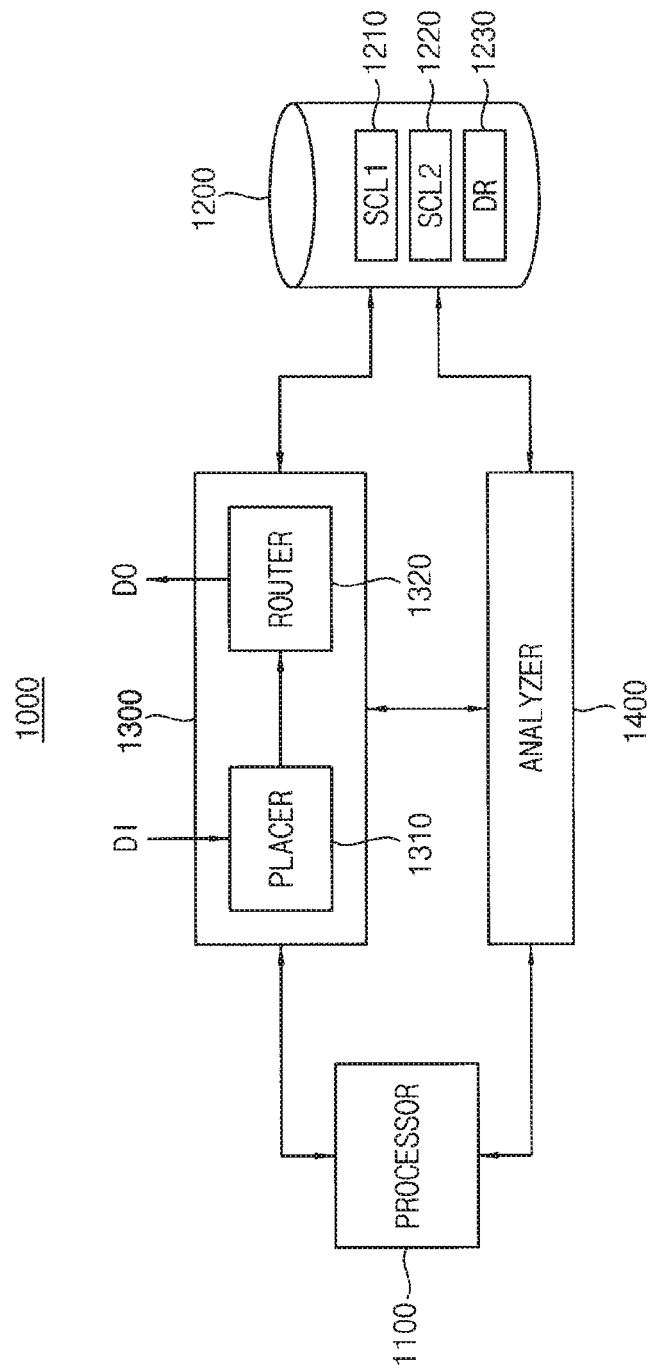
FIGS. 5 and 6 are block diagrams illustrating a design system for generating an integrated circuit design according to an exemplary embodiment of the inventive concept.
Figure 6:
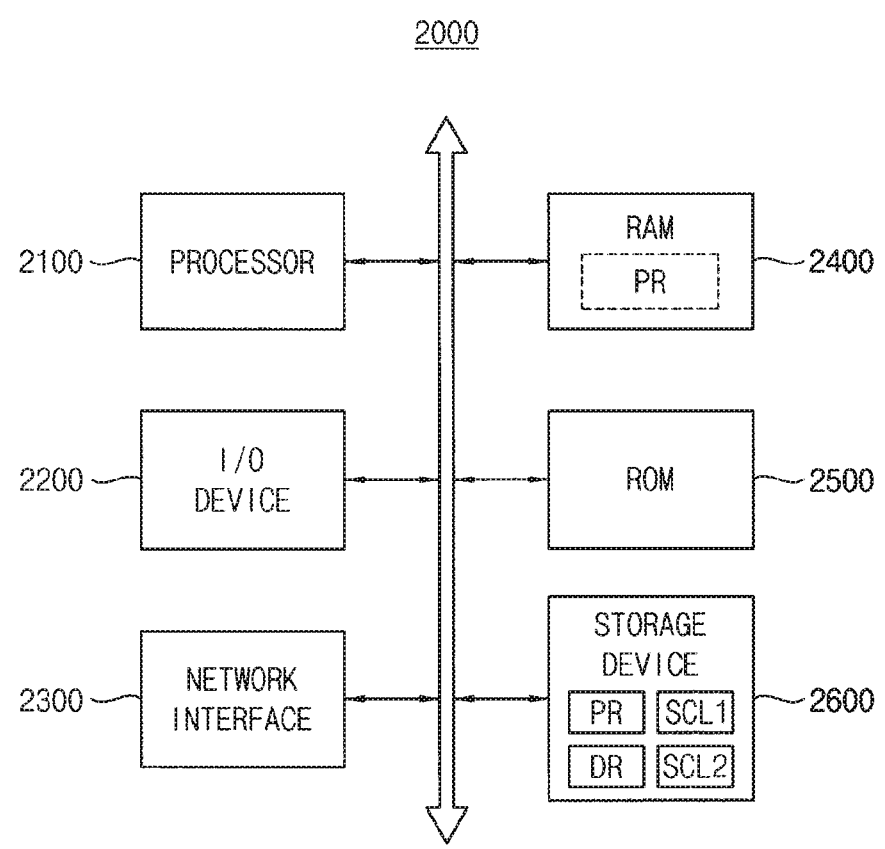

FIGS. 5 and 6 are block diagrams illustrating a design system for generating an integrated circuit design according to an exemplary embodiment of the inventive concept.

Referring to FIG. 5, a design system 1000 for an integrated circuit design includes a processor 1100, a storage device 1200, a designing module 1300 and an analyzing module or analyzer 1400.

Herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, routines, segments of program code, drivers, firmware, microcode, circuitry, data, databases, data structures, tables, arrays, and variables. A "module" may be divided into a plurality of "modules" that perform detailed functions.

The processor 1100 may be used when the designing module 1300 and/or the analyzer 1400 performs a computation. For example, the processor 1100 may include a microprocessor, an application processor (AP), a digital signal processor (DSP), a graphic processing unit (GPU), or the like. In FIG. 5, only one processor 1100 is illustrated, but exemplary embodiments of the inventive concept are not limited thereto. For example, a plurality of processors may be included in the design system 1000. In addition, the processor 1100 may include cache memories to increase computation capacity.

The storage device 1200 may include a first standard cell library (SCL1) 1210 and a second standard cell library (SCL2) 1220, and may further include a design rule (DR) 1230. The first standard cell library 1210, the second standard cell library 1220 and the design rule 1230 may be provided from the storage device 1200 to the designing module 1300 and/or the analyzer 1400. The design rule 1230 may provide a set of guidelines for constructing various masks needed in fabrication of the integrated circuit. For example, the design rule 1230 may include minimum width and minimum spacing requirements between cells on a same layer or between cells on different layers. Further, the design rule 1230 may include minimum line widths of routing wires.

The first standard cell library 1210 may include the first type of standard cells, and the second standard cell library 1220 may include the second type of standard cells. As an example of the first type of standard cells, the first standard cell STC1 is described with reference to FIGS. 2A, 3 and 4. As an example of the second type of standard cells, the second standard cell STC2 is described with reference to FIGS. 2B, 3 and 4.

In some exemplary embodiments, the storage medium or the storage device 1200 may include any non-transitory computer-readable storage medium used to provide commands and/or data to a computer. For example, the non-transitory computer-readable storage medium 1200 may include volatile memory such as random access memory (RAM), read only memory (ROM), etc. and nonvolatile memory such as flash memory, magnetoresistive RAM (MRAM), phase-change RAM (PRAM), resistive RAM (RRAM), etc. The non-transitory computer-readable storage medium 1200 may be inserted into the computer, may be integrated in the computer, or may be coupled to the computer through a communication medium such as a network and/or a wireless link.

The designing module 1300 may include a placer 1310 (e.g., a placer module) and a router 1320 (e.g., a route module).

The placer 1310 may place or arrange, using the processor 1100, the first type of standard cells and the second type of standard cells based on input data DI defining an integrated circuit design, the first standard cell library 1210 and the second standard cell library 1220. The router 1320 may perform signal routing with respect to the cell placement provided from the placer 1310.

The analyzer 1400 may analyze and verify a result of the placement and signal routing. If it is determined based on a result of the analysis that the routing is not successful, the placer 1310 may modify the previous cell placement and the router 1320 may perform the signal routing with the modified cell placement. When it is determined based on the result of the analysis that the routing has successfully completed, the router 1320 may provide output data DO defining the integrated circuit design.

According to exemplary embodiments, the placer 1310 and the router 1320 may be implemented by a single integrated designing module 1300 or may be implemented by separate and different modules.

The designing module 1300 and/or the analyzer 1400 may be implemented in software, but exemplary embodiments of the inventive concept are not limited thereto. When both the designing module 1300 and the analyzer 1400 are implemented in software, the designing module 1300 and the analyzer 1400 may be stored in a form of code in the storage device 1200, or may be stored in a form of code in another storage device (not illustrated) separate from the storage device 1200.

Referring to FIG. 6, a design system 2000 for generating an integrated circuit design includes a processor 2100, an input/output (I/O) device 2200, a network interface 2300, a random access memory (RAM) 2400, a read only memory (ROM) 2500, and a storage device 2600. FIG. 6 illustrates an example where both the designing module 1300 and the analyzer 1400 in FIG. 5 are implemented in software.

The design system 2000 may be a computing system. For example, the computing system may be a fixed computing system such as a desktop computer, a workstation or a server, or may be a portable computing system such as a laptop computer.

The processor 2100 in FIG. 6 may be substantially the same as the processor 1100 in FIG. 5. For example, the processor 2100 may include a core or a processor core for executing an arbitrary instruction set (for example, intel architecture-32 (IA-32), 64 bit extension IA-32, x86-64, PowerPC, Sparc, MIPS, ARM, IA-64, etc.). For example, the processor 2100 may access a memory (e.g., the RAM 2400 or the ROM 2500) through a bus, and may execute instructions stored in the RAM 2400 or the ROM 2500. As illustrated in FIG. 6, the RAM 2400 may store a program PR corresponding to the designing module 1300 and the analyzer 1400 in FIG. 5 or at least some elements of the program PR, and the program PR may allow the processor 2100 to perform an operation of generating an integrated circuit design.

In other words, the program PR may include a plurality of instructions and/or procedures executable by the processor 2100, and the plurality of instructions and/or procedures included in the program PR may allow the processor 2100 to perform the method of generating the integrated circuit design according to exemplary embodiments of the inventive concept. Each of the procedures may denote a series of instructions for performing a certain task. A procedure may be referred to as a function, a routine, a subroutine, or a subprogram. Each of the procedures may process data provided from the outside and/or data generated by another procedure.

The storage device 2600 in FIG. 6 may be substantially the same as the storage device 1200 in FIG. 5. For example, the storage device 2600 may store the program PR, and may store a first standard cell library SCL1, a second standard cell library SCL2 and a design rule DR. The program PR or at least some elements of the program PR may be loaded from the storage device 2600 to the RAM 2400 before being executed by the processor 2100. The storage device 2600 may store a file written in a program language, and the program PR generated by a compiler or at least some elements of the program PR may be loaded to the RAM 2400.

The storage device 2600 may store data, which is to be processed by the processor 2100, or data obtained through processing by the processor 2100. The processor 2100 may process the data stored in the storage device 2600 to generate new data, based on the program PR and may store the generated data in the storage device 2600.

The I/O device 2200 may include an input device, such as a keyboard, a pointing device, or the like, and may include an output device such as a display device, a printer, or the like. For example, a user may trigger, through the I/O devices 2200, execution of the program PR by the processor 2100 or may input the input data DI in FIG. 5, and may check the output data DO in FIG. 5 or an error message.

The network interface 2300 may provide access to a network outside the design system 2000. For example, the network may include a plurality of computing systems and communication links, and the communication links may include wired links, optical links, wireless links, or arbitrary other type links. The input data DI in FIG. 5 may be provided to the design system 2000 through the network interface 2300, and the output data DO in FIG. 5 may be provided to another computing system through the network interface 2300.

Figure 7:
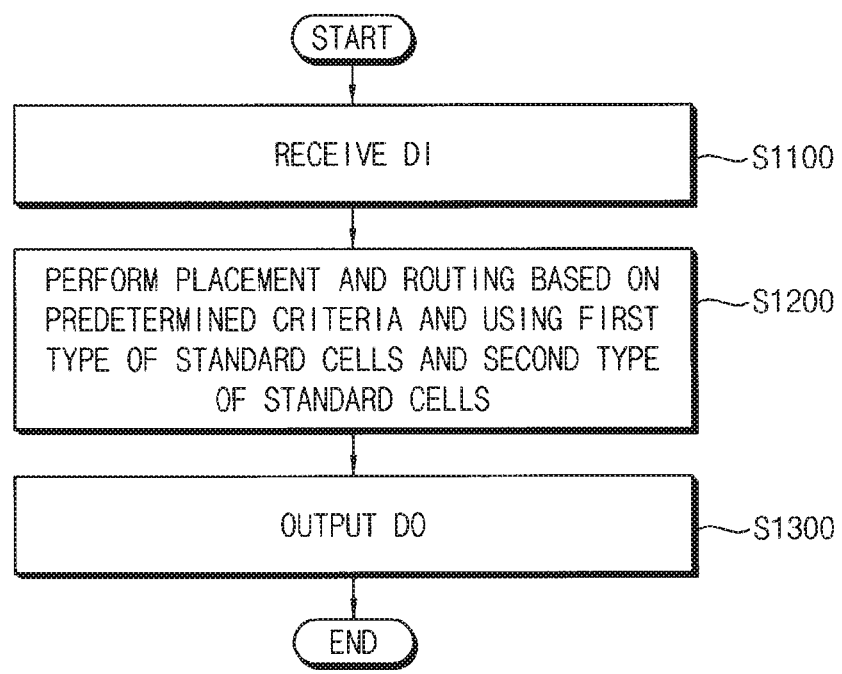
FIG. 7 is a flowchart illustrating an example of an operation of a design system for generating an integrated circuit design according to an exemplary embodiment of the inventive concept.
Figure 8:
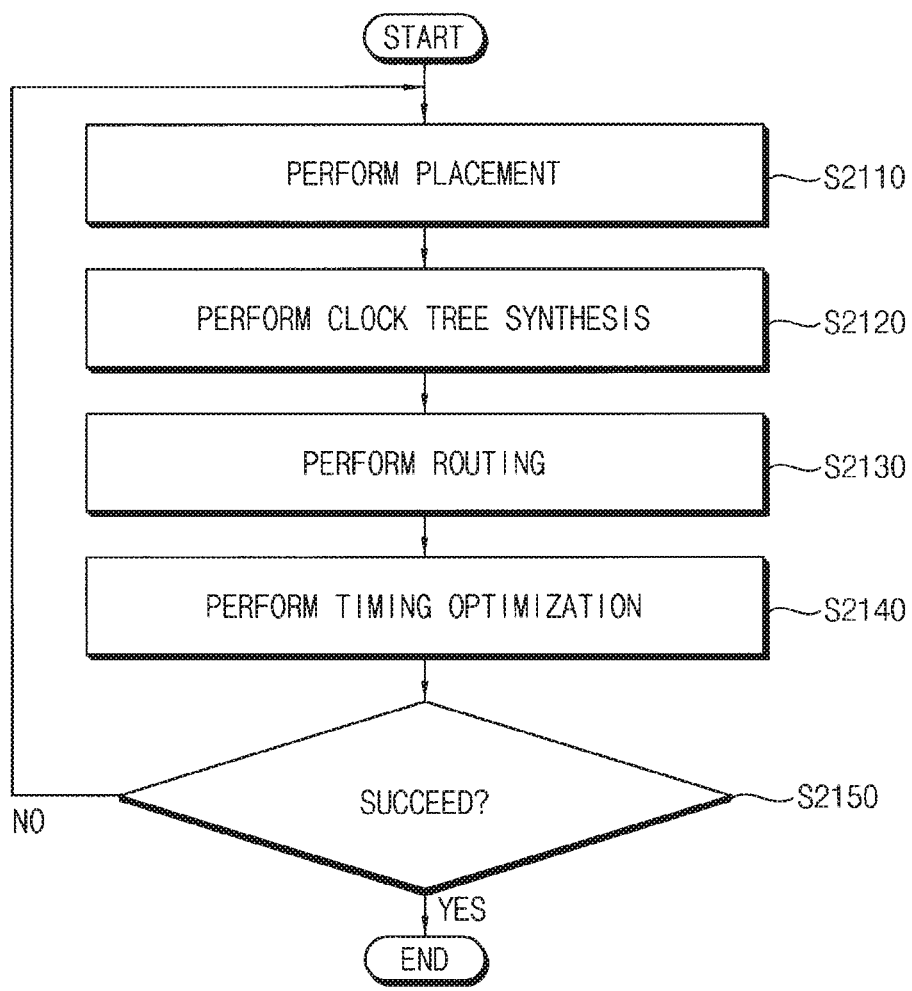
FIG. 8 is a flowchart illustrating an example of performing placement and routing in FIG. 7.

FIG. 7 is a flowchart illustrating an example of an operation of a design system for generating an integrated circuit design according to an exemplary embodiment of the inventive concept. FIG. 8 is a flowchart illustrating an example of performing placement and routing in FIG. 7.

Referring to FIG. 7, the designing module 1300 in FIG. 5 or one of the I/O device 2200 and the network interface 2300 in FIG. 6 receives the input data DI defining the integrated circuit design (step S1100).

The designing module 1300 and the analyzer 1400 in FIG. 5 or the program PR in FIG. 6 may refer to, using the processor 1100 in FIG. 5 or the processor 2100 in FIG. 6, the first standard cell library 1210 and the second standard cell library 1220 to extract the first type of standard cells and the second type of standard cells corresponding to the input data DI and perform placement and routing based on predetermined rules or criteria and using the extracted standard cells (step S1200).

Referring to FIG. 8, when performing the placement and routing (step S1200), the placer 1310 included in the designing module 1300 in FIG. 5 or a part of the program PR in FIG. 6 corresponding to the placer 1310 may perform cell placement using the extracted standard cells (step S2110), and may perform clock tree synthesis (CTS) (step S2120). The first type of standard cells and the second type of standard cells may be appropriately used or applied based on the predetermined rules or criteria in the placement process and the clock tree synthesis process, as will be described later.

In addition, the router 1320 included in the designing module 1300 in FIG. 5 or a part of the program PR in FIG. 6 corresponding to the router 1320 may perform signal routing with respect to the placed cells (step S2130), and may perform timing optimization (step S2140). The first type of standard cells and the second type of standard cells may be appropriately used or applied based on the predetermined rules or criteria in the timing optimization process, as will be described later.

The analyzer 1400 in FIG. 5 or a part of the program PR in FIG. 6 corresponding to the analyzer 1400 may check whether the placement and routing have been successfully completed (step S2150). When the placement and routing are not successful (step S2150: NO), e.g., when at least one of the signal routing and the timing optimization are not successful, steps S2110, S2120, S2130 and S2140 may be repeated or recursively performed. In other words, the above described processes of FIG. 8 may be repeated until the placement and routing have successfully completed.

Referring again to FIG. 7, when the placement and routing have successfully completed (step S2150 in FIG. 8: YES), the designing module 1300 in FIG. 5 or one of the I/O device 2200 and the network interface 2300 in FIG. 6 generate the output data DO defining the integrated circuit design (step S1300).

In some exemplary embodiments, as will be described with reference to FIGS. 9 through 15, the first type of standard cells and the second type of standard cells may be used together to perform the placement and routing. In other exemplary embodiments, as will be described with reference to FIGS. 16 through 19, the first type of standard cells may be preferentially used to perform the placement and routing, and then some of the first type of standard cells satisfying a specific condition may be replaced with the second type of standard cells.

Figure 9:
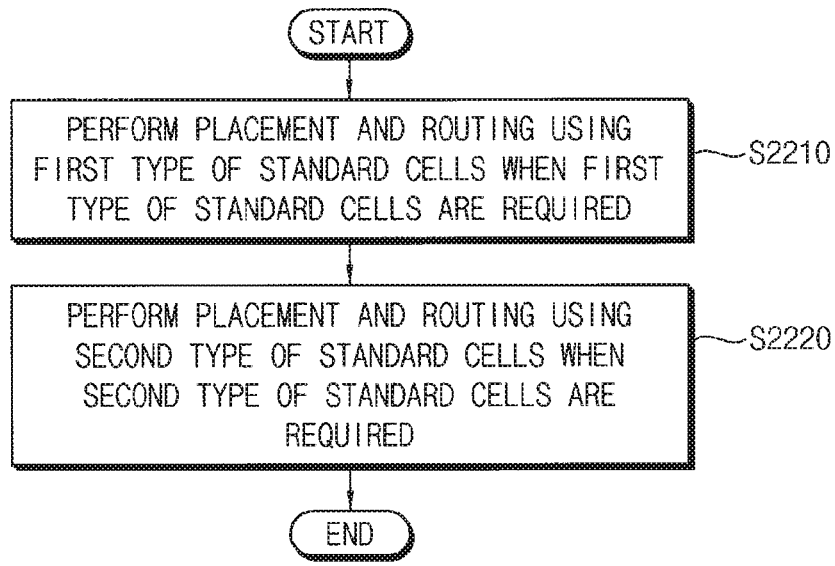
FIG. 9 is a flowchart illustrating an example of performing placement and routing in a method of generating an integrated circuit design according to an exemplary embodiment of the inventive concept.

FIG. 9 is a flowchart illustrating an example of performing placement and routing in a method of generating an integrated circuit design according to an exemplary embodiment of the inventive concept.

Referring to FIG. 9, when generating the output data by performing the placement and routing, the placement and routing are performed using the first type of standard cells when the first type of standard cells are required (step S2210), and the placement and routing are performed using the second type of standard cells when the second type of standard cells are required (step S2220). For example, whether the first type of standard cells are required or the second type of standard cells are required may be determined according to performance and/or area of a target cell.

Figure 10:
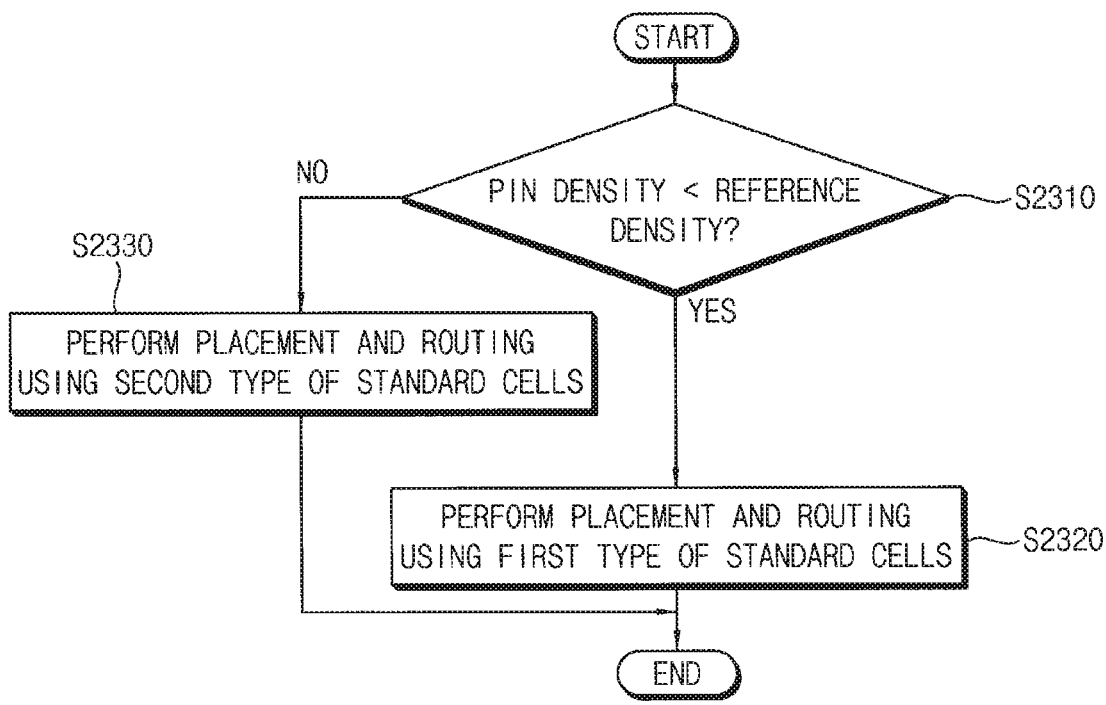
FIG. 10 is a flowchart illustrating an example of performing placement and routing of FIG. 9.
Figure 11:
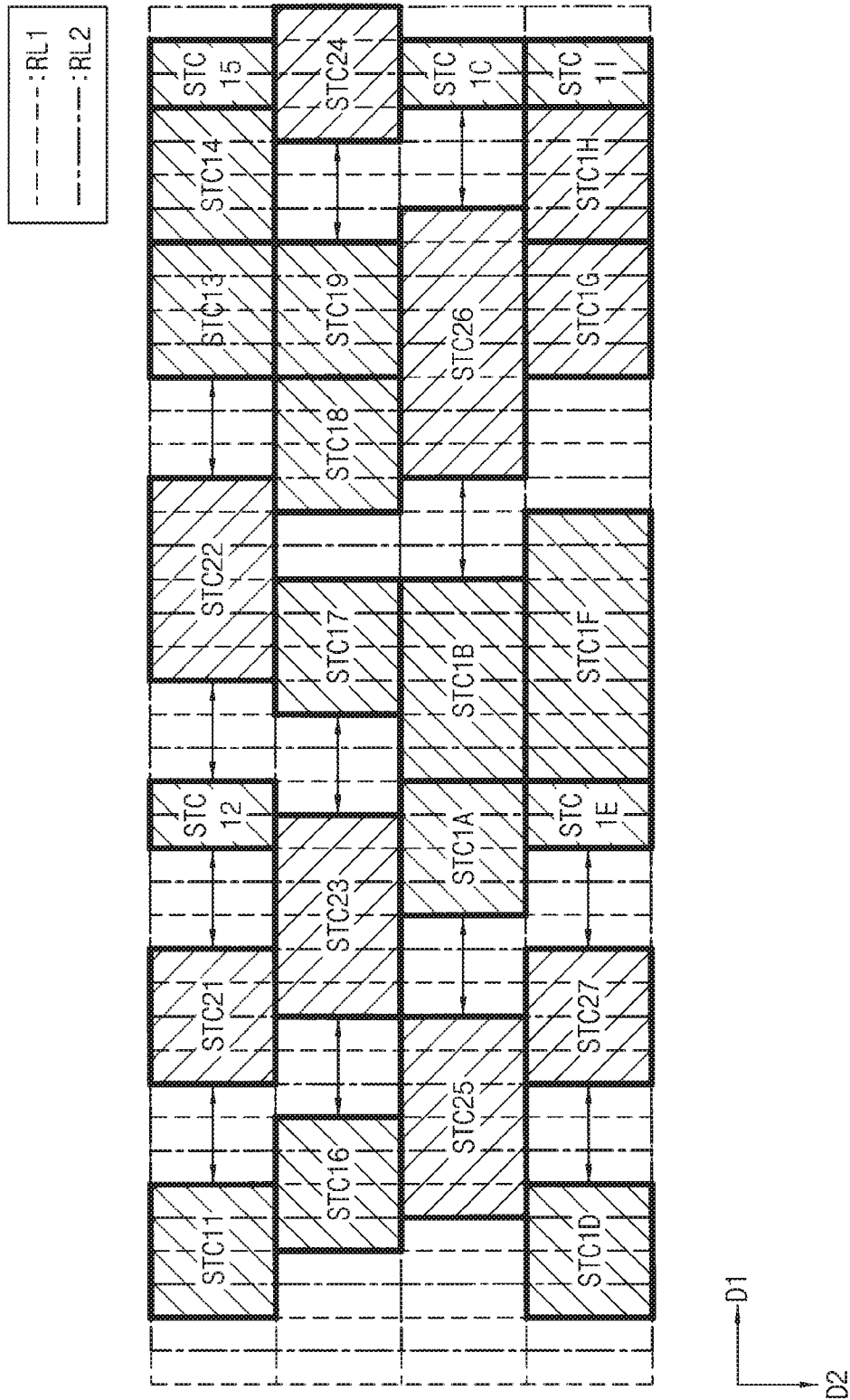
FIG. 11 is a layout diagram illustrating an example where a first type of standard cells and a second type of standard cells are placed in one integrated circuit design by operations of FIGS. 9 and 10.

FIG. 10 is a flowchart illustrating an example of performing placement and routing of FIG. 9. FIG. 11 is a layout diagram illustrating an example where a first type of standard cells and a second type of standard cells are placed in an integrated circuit design representing a single integrated circuit by operations of FIGS. 9 and 10.

Referring to FIG. 10, a pin density of a target standard cell (e.g., a standard cell to be placed in the integrated circuit design) is checked to determine whether the first type of standard cells are required for the target standard cell or the second type of standard cells are required for the target standard cell (step S2310).

When the pin density of the target standard cell is smaller than a reference density (step S2310: YES), the placement and routing for the target standard cell are performed using the first type of standard cells (step S2320). When the pin density of the target standard cell is greater than or equal to the reference density (step S2310: NO), the placement and routing for the target standard cell is performed using the second type of standard cells (step S2330).

As described with reference to FIGS. 2A and 2B, one of the second type of standard cells (e.g., the second standard cell STC2) may have a larger area than a corresponding one of the first type of standard cells (e.g., the first standard cell STC1) having the same function. Thus, when the pin density of the target standard cell is greater than or equal to the reference density, e.g., when the number of pins and pin density required for a net connection with respect to a cell area of the target standard cell is relatively great, the second type of standard cells having a relatively large area may be used or applied. Accordingly, routing for a pin-to-pin connection may be facilitated, and routing congestion may be reduced.

In some exemplary embodiments, the target standard cell having a pin density greater than or equal to the reference density may include, for example, cells having relatively small driving strength among basic cells (e.g., an AND logic gate, an OR logic gate) or combinational cells, complex cells (e.g., an OAI, an AOI) including a plurality of basic cells or combination cells, and the like.

Although FIG. 10 illustrates an example where the type of the target standard cell is determined based on the pin density (e.g., the area of the cell), exemplary embodiments of the inventive concept are not limited thereto. For example, the first type of standard cells (e.g., the first standard cell STC1) may be an area oriented cell formed to have a relatively small area, and the second type of standard cells (e.g., the second standard cell STC2) are may be a performance oriented cell formed to have relatively improved performance, as described with reference to FIGS. 2A and 2B. Thus, when the target standard cell requires relatively improved performance, the second type of standard cells having relatively improved performance may be used or applied for the target standard cell. In other words, the type of the target standard cell may be determined based on the performance or the cell. Alternatively, the type of the target standard cell may be determined based on at least one of various criteria or rules.

Referring to FIG. 11, an integrated circuit design including the first type of standard cells STC11, STC12, STC13, STC14, STC15, STC16, STC17, STC18, STC19, STC1A, STC1B, STC1C, STC1D, STC1E, STC1F, STC1G, STC1H and STC1I and the second type of standard cells STC21, STC22, STC23, STC24, STC25, STC26 and STC27 may be designed based on processes described with reference to FIGS. 9 and 10. In other words, all of a plurality of standard cells to be placed or included in the integrated circuit design may be determined as one of the first type and the second type, and the placement and routing may be performed based on the determined types of the standard cells.

The bidirectional arrows illustrated in FIG. 11 may indicate the reference distance WSD described with reference to FIG. 3. Different types of standard cells (e.g., STC11 and STC21) that are adjacent to each other in the same row of the integrated circuit design should be spaced apart from each other by a distance greater than or equal to the reference distance WSD. On the other hand, the same type of standard cells (e.g., STC13 and STC14) that are adjacent to each other in the same row of the integrated circuit design may be arranged closer than the reference distance WSD, and may be, e.g., formed to be in direct contact.

Figure 12:
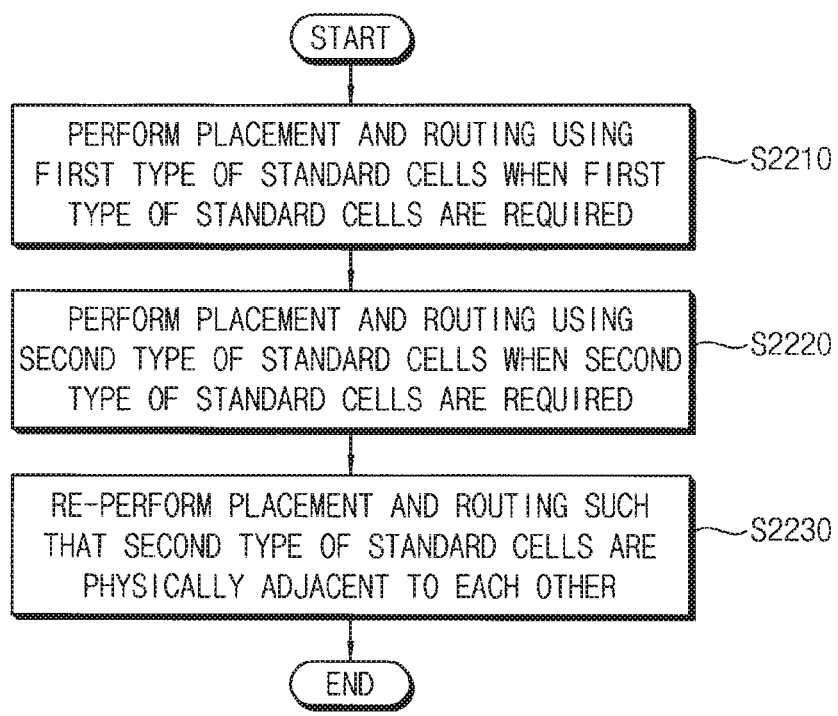
FIG. 12 is a flowchart illustrating another example of performing placement and routing in a method of generating an integrated circuit design according to an exemplary embodiment of the inventive concept.
Figure 13A:
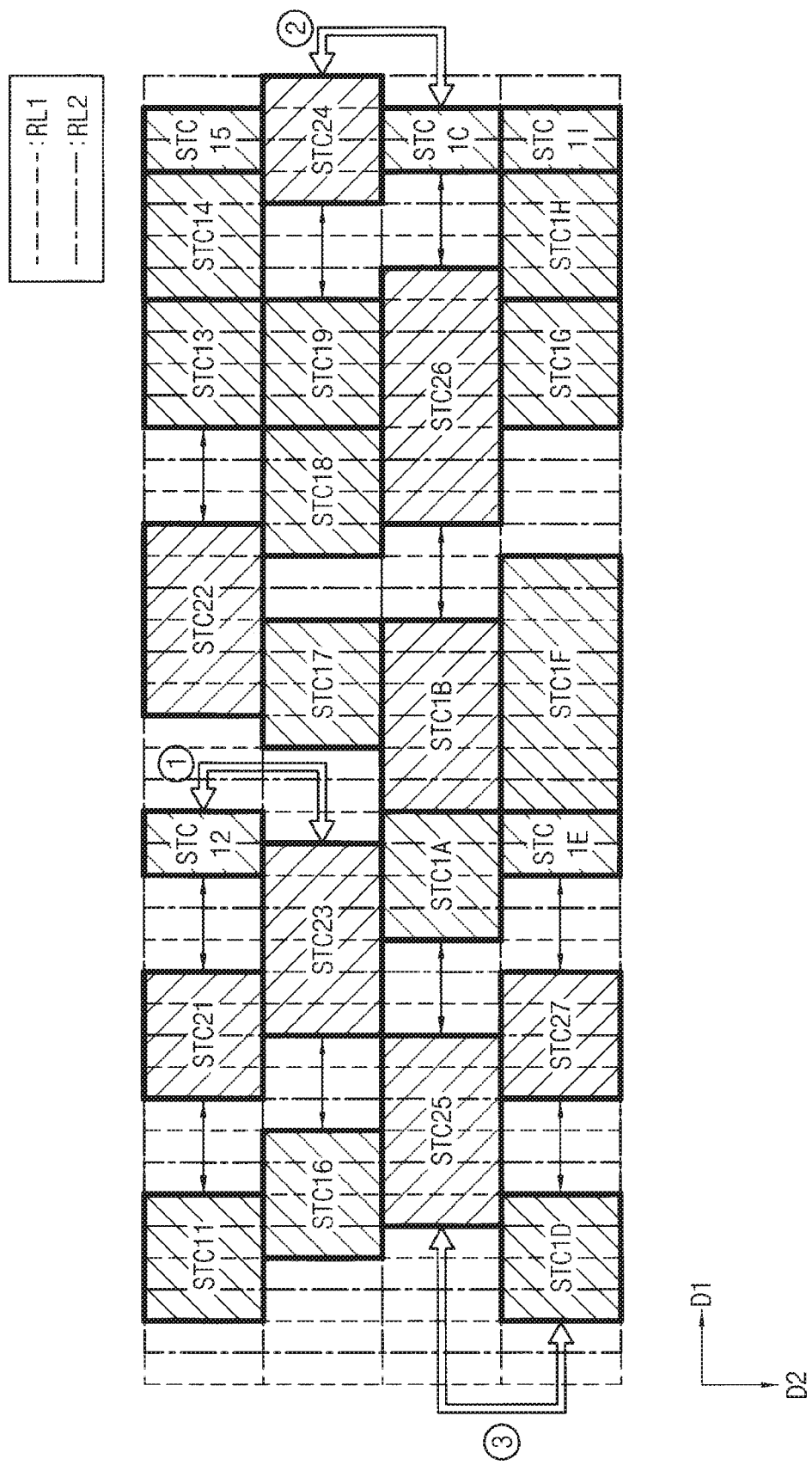
FIGS. 13A and 13B are layout diagrams illustrating an example where a first type of standard cells and a second type of standard cells are placed in one integrated circuit by operations of FIG. 12.
Figure 13B:
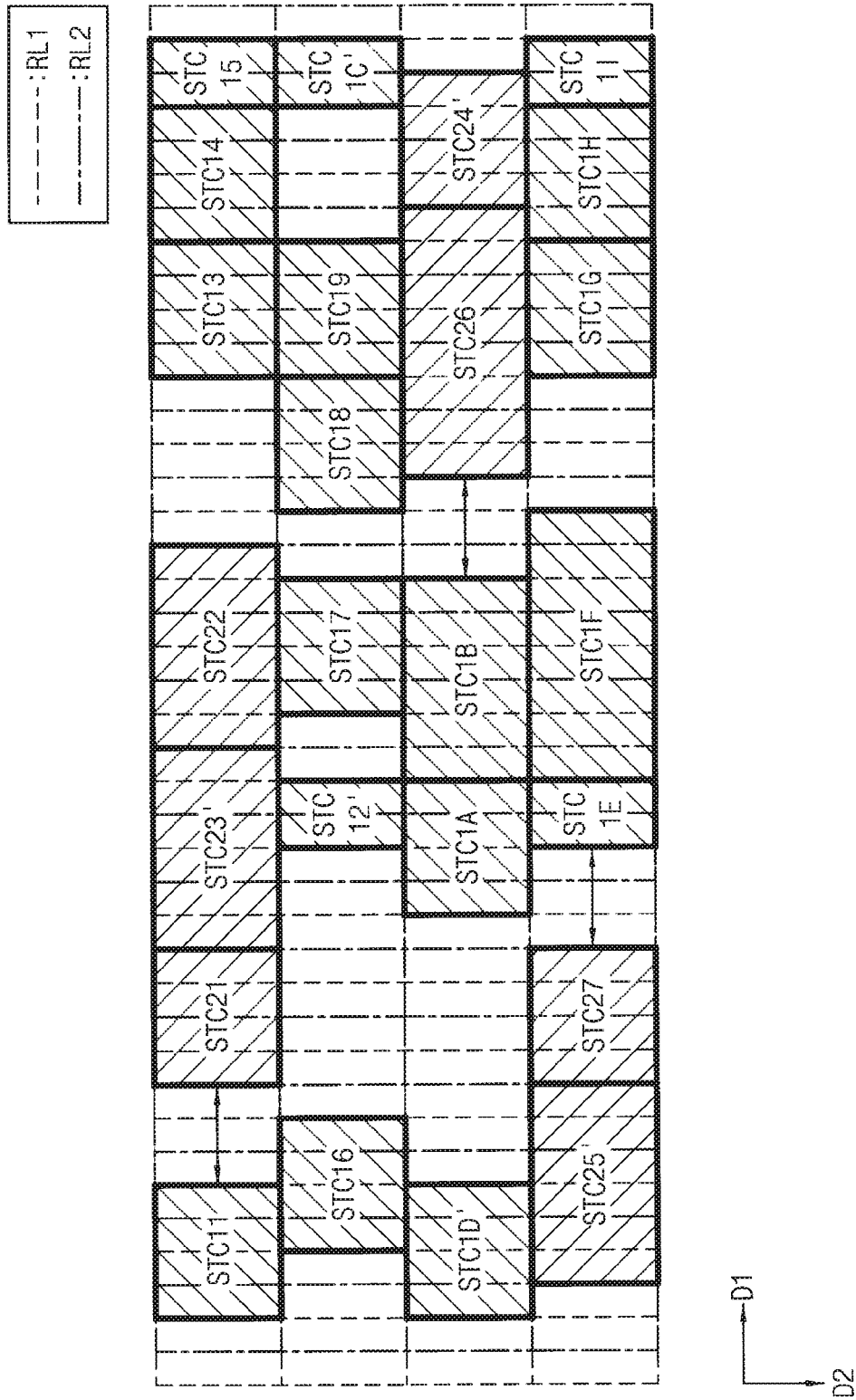

FIG. 12 is a flowchart illustrating another example of performing placement and routing in a method of generating an integrated circuit design according to an exemplary embodiment of the inventive concept. FIGS. 13A and 13B are layout diagrams illustrating an example where a first type of standard cells and a second type of standard cells are placed in an integrated circuit design representing a single integrated circuit by operations of FIG. 12. The descriptions repeated with FIGS. 9, 10 and 11 will be omitted.

Referring to FIG. 12, steps S2210 and S2220 in FIG. 12 may be substantially the same as steps S2210 and S2220 in FIG. 9, respectively.

After performing the placement and routing using the first type of standard cells and the second type of standard cells, the placement and routing are re-performed such that target standard cells among a plurality of standard cells placed in the integrated circuit design are physically adjacent to each other (step S2230). The target standard cells may correspond to the second type of standard cells. In other words, the placement and routing may be re-performed such that the second type of standard cells in the integrated circuit design are physically adjacent to each other, and thus an extra space for cell placement may be additionally obtained by arranging the same type of standard cells to be physically adjacent to each other.

Referring to FIG. 13A, an integrated circuit design substantially the same as that illustrated in FIG. 11 may be designed by steps S2210 and S2220 of FIG. 12. In this example, white space zones for the reference distance WSD may be required between different types of standard cells STC21 and STC12 and different types of standard cells STC12 and STC22 in a first row of the integrated circuit design. Similarly, white space zones may also be required between different types of standard cells STC16 and STC23, between different types of standard cells STC23 and STC17, between different types of standard cells STC19 and STC24, between different types of standard cells STC25 and STC1A, between different types of standard cells STC26 and STC1C, and between different types of standard cells STC1D and STC27.

Since spaces for cell placement may be reduced due to the white space zones, locations of the standard cells STC12 and STC23 may be exchanged by step S2230 in FIG. 12 (e.g., an arrow ① in FIG. 13A) such that the second type of standard cells STC21, STC22 and STC23 are adjacent to each other in the first row. Similarly, locations of the standard cells STC24 and STC1C may be exchanged (e.g., an arrow ② in FIG. 13A), and locations of the standard cells STC25 and STC1D may be exchanged (e.g., an arrow ③ in FIG. 13A).

Referring to FIG. 13B, an integrated circuit design including the first type of standard cells STC11, STC12', STC13, STC14, STC15, STC16, STC17, STC18, STC19, STC1A, STC1B, STC1C', STC1D', STC1E, STC1F, STC1G, STC1H and STC1I and the second type of standard cells STC21, STC22, STC23', STC24', STC25', STC26 and STC27 may be designed by re-performing the placement and routing by step S2230 in FIG. 12.

In comparison with a layout of FIG. 13A, the second type of the standard cells STC21, STC22 and STC23' may be arranged to be adjacent to each other in the same row in a layout of FIG. 13B, the second type of the standard cells STC24' and STC26 may be arranged to be adjacent to each other in the same row in the layout of FIG. 13B, and the second type of the standard cells STC25' and STC27 may be arranged to be adjacent to each other in the same row in the layout of FIG. 13B. As described above, the same type of standard cells may be arranged closer than the reference distance WSD in the same row, and thus spaces for cell placement between the standard cells STC12 'and STC16 and between the standard cells STC1A and STC1D' may be further obtained.

Figure 14:
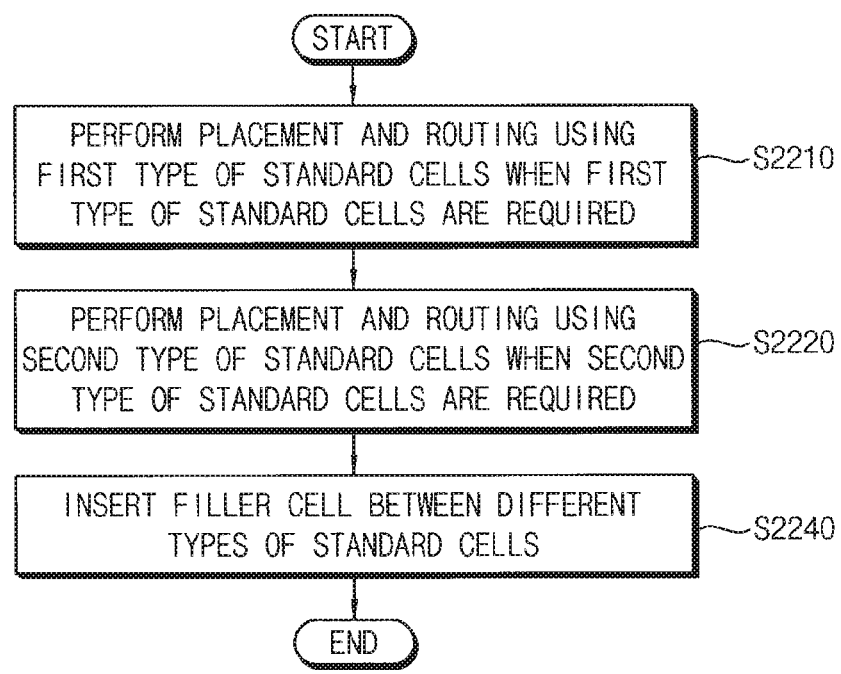
FIG. 14 is a flowchart illustrating an example of performing placement and routing in a method of generating an integrated design according to an exemplary embodiment of the inventive concept.
Figure 15:
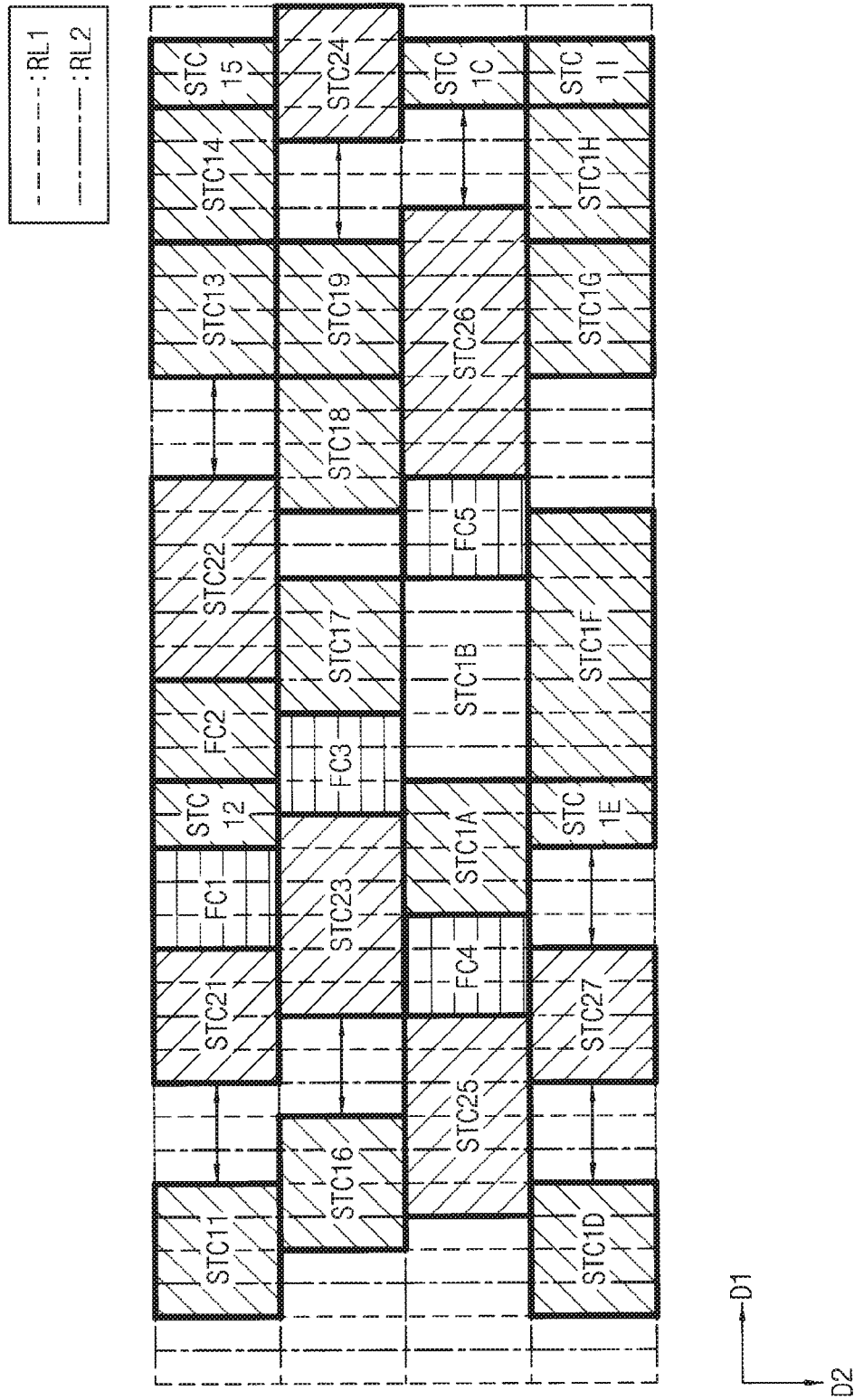
FIG. 15 is a layout diagram illustrating an example where a first type of standard cells and a second type of standard cells are placed in one integrated circuit by operations of FIG. 14.

FIG. 14 is a flowchart illustrating an example of performing placement and routing in a method of generating an integrated circuit design according to an exemplary embodiment of the inventive concept. FIG. 15 is a layout diagram illustrating an example where a first type of standard cells and a second type of standard cells are placed in an integrated circuit design representing one integrated circuit by operations of FIG. 14. The descriptions repeated with FIGS. 9, 10 and 11 will be omitted.

Referring to FIG. 14, steps S2210 and S2220 in FIG. 14 may be substantially the same as steps S2210 and S2220 in FIG. 9, respectively.

After performing the placement and routing using the first type of standard cells and the second type of standard cells, a filler cell is inserted between different types of standard cells (step S2240). The filler cell may be a third type of cell, and may be different from the first type of standard cells and the second type of standard cells.

Referring to FIG. 15, an integrated circuit design having the same layout as that illustrated in FIG. 11 may be designed by steps S2210 and S2220 of FIG. 14, and filler cells FC1, FC2, FC3, FC4 and FC5 may be inserted between standard cells STC21 and STC12, between standard cells STC12 and STC22, between standard cells STC23 and STC17, between standard cells STC25 and STC1A, and between standard cells STC1B and STC26, respectively, by step S2240 in FIG. 14. The empty space in the integrated circuit design may be filled by inserting the filler cells FC1, FC2, FC3, FC4 and FC5.

In an exemplary embodiment, the filler cells FC1, FC2, FC3, FC4 and FC5 are dummy cells. In an exemplary embodiment, the filler cells FC1, FC2, FC3, FC4 and FC5 are cells manufactured in a scheme different from that (e.g., the first diffusion break scheme) of the first type of standard cells STC11, STC12, STC13, STC14, STC15, STC16, STC17, STC18, STC19, STC1A, STC1B, STC1C, STC1D, STC1E, STC1F, STC1G, STC1H and STC1I and that (e.g., the second diffusion break scheme) of the second type of standard cells STC21, STC22, STC23, STC24, STC25, STC26 and STC27. According to an exemplary embodiment, all of the filler cells FC1, FC2, FC3, FC4 and FC5 are the same type, or at least some of the filler cells FC1, FC2, FC3, FC4 and FC5 may be different types.

Although FIG. 15 illustrates an example where the filler cells FC1, FC2, FC3, FC4 and FC5 are inserted only in a part of the integrated circuit design, exemplary embodiments of the inventive concept are not limited thereto. For example, filler cells may be inserted in all empty spaces of the integrated circuit design.

Figure 16:
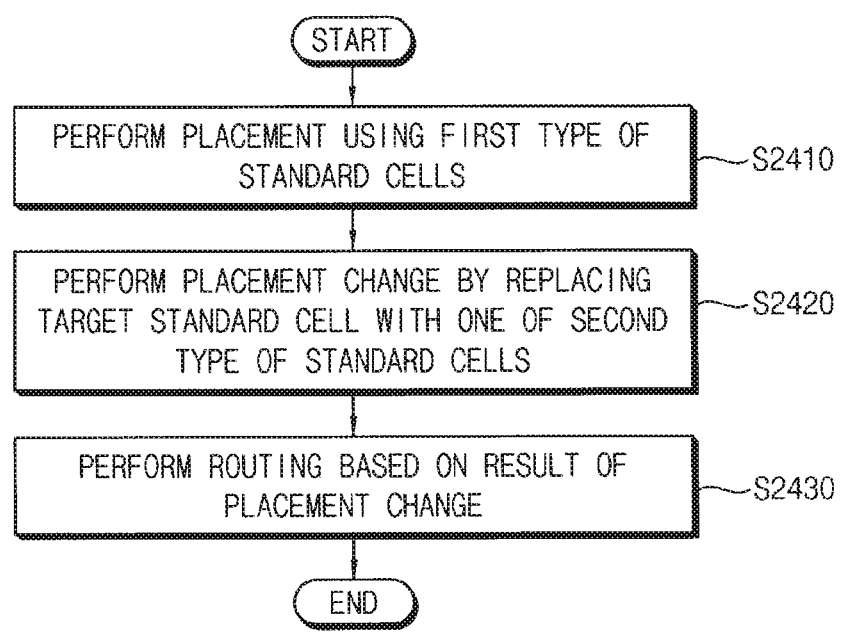
FIG. 16 is a flowchart illustrating an example of performing placement and routing in a method of generating an integrated circuit design according to an exemplary embodiment of the inventive concept.
Figure 17:
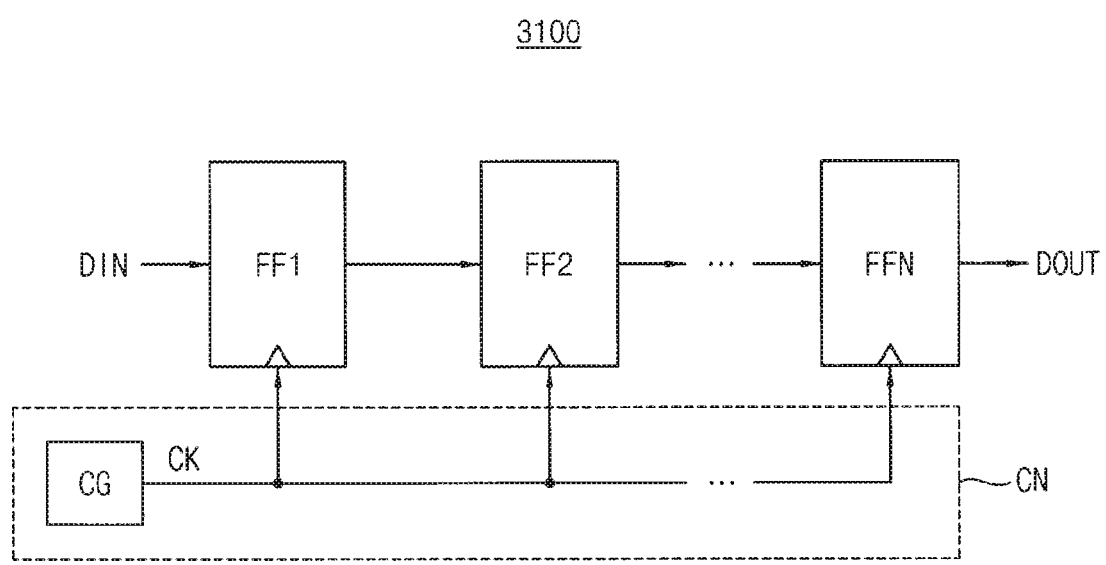
FIG. 17 is a diagram illustrating an example of an integrated circuit designed by operations of FIG. 16.

FIG. 16 is a flowchart illustrating an example of performing placement and routing in a method of generating an integrated circuit design according to an exemplary embodiment of the inventive concept. FIG. 17 is a diagram illustrating an example of an integrated circuit designed by operations of FIG. 16.

Referring to FIG. 16, when generating the output data by performing the placement and routing, the placement is performed using the first type of standard cells (step S2410), a placement change is performed by replacing a target standard cell among a plurality of standard cells placed in the integrated circuit design obtained by a result of step S2410 with one of the second type of standard cells (step S2420), and the routing is performed based on a result of the placement change (step S2430). In other words, the first type of standard cells may be preferentially used or applied to the integrated circuit design to perform the placement process first, and then the target standard cell that is a part of the first type of standard cells may be replaced with one of the second type standard cells. The routing may be performed after the placement and the placement change.

In at least one exemplary embodiment, the target standard cell is a standard cell used in a clock network. As described with reference to FIGS. 2A and 2B, since the second type of standard cells (e.g., the second standard cell STC2) are a performance oriented cell formed to have relatively improved performance, standard cells used in a clock network that needs to be enhanced in performance may be implemented only as the second type of standard cells to minimize skew between clock signals, and thus the integrated circuit may have improved performance. In an exemplary embodiment, the clock network is a clock tree or a clock mesh. A clock network may include multiple clock sinks, such as flip flops and an integrated clock gater. A clock gater may be a circuit or a component that controls the application or non-application (e.g., or enable/disable) of one or more clock signal(s) in relation to one or more clock sink(s). A clock network found in an integrated circuit includes a clock gater connected to a plurality of flip-flips through a number of inverters. The inverters may be used to control clock skew.

Referring to FIG. 17, the placement may be performed using the first type of standard cells by step S2410 in FIG. 16 such that flip-flops FF1, FF2, . . . , FFN and a clock generator CG included in an integrated circuit 3100 are implemented. To improve performance of a clock network CN (e.g., a clock path) associated with generation and delivery of a clock signal CK rather than a data path associated with input data DIN and output data DOUT, the first type of standard cells included in the clock network CN may be replaced with the second type of standard cells by step S2420 in FIG. 16. After then, the routing may be performed by step S2430 in FIG. 16 to complete the design of the integrated circuit 3100.

Figure 18:
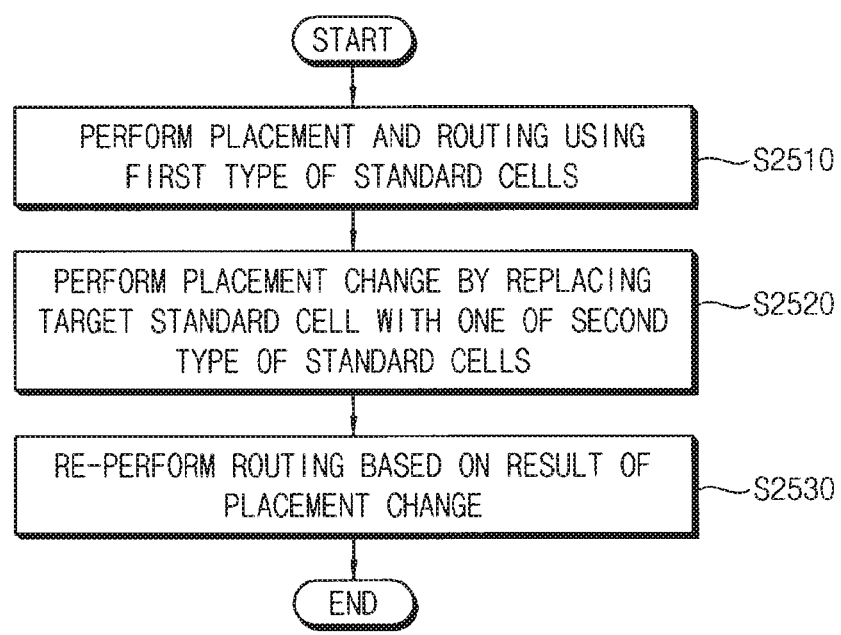
FIG. 18 is a flowchart illustrating an example of performing placement and routing in a method of generating an integrated circuit design according to an exemplary embodiment of the inventive concept.
Figure 19:
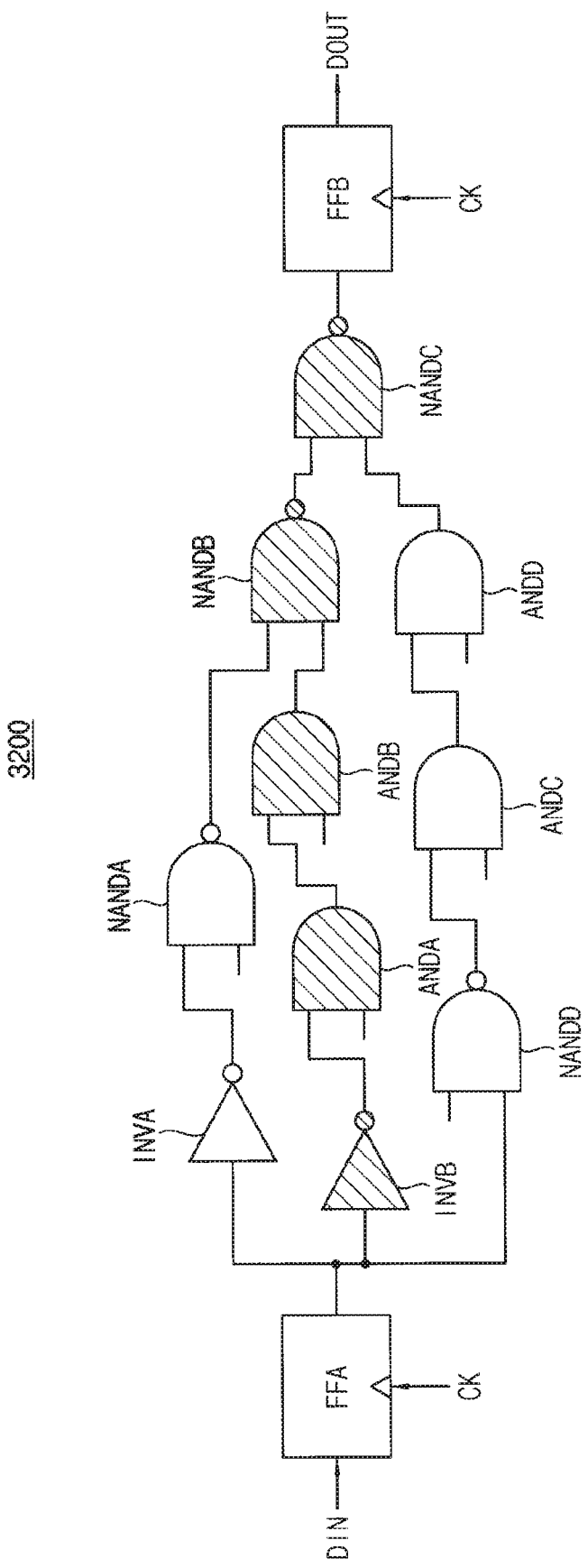
FIG. 19 is a diagram illustrating an example of an integrated circuit designed by operations of FIG. 18.

FIG. 18 is a flowchart illustrating an example of performing placement and routing in a method of generating an integrated circuit design according to an exemplary embodiment of the inventive concept. FIG. 19 is a diagram illustrating an example of an integrated circuit designed by operations of FIG. 18.

Referring to FIG. 18, when generating the output data by performing the placement and routing, the placement and routing are performed using the first type of standard cells (step S2510), a placement change is performed by replacing a target standard cell among a plurality of standard cells placed in the integrated circuit design obtained by a result of step S2510 with one of the second type of standard cells (step S2520), and the routing is re-performed based on a result of the placement change (step S2530). In other words, the first type of standard cells may be preferentially used or applied to the integrated circuit design to perform the placement and routing processes first, and then the target standard cell that is a part of the first type of standard cells is replaced with one of the second type standard cells. The routing may be re-performed after the placement change.

In at least one exemplary embodiment, the target standard cell is a standard cell used in a timing critical data path among a plurality of data paths included in the integrated circuit design. As described with reference to FIGS. 2A and 2B, since the second type of standard cells (e.g., the second standard cell STC2) are a performance oriented cell formed to have relatively improved performance, standard cells used in a data path sensitive to timing characteristic may be implemented only as the second type of standard cells, and thus the integrated circuit may have improved performance.

Referring to FIG. 19, the placement and routing may be performed using the first type of standard cells by step S2510 in FIG. 18 such that flip flops FFA and FFB, inverters INVA and INVB, NAND gates NANDA, NANDB, NANDC and NANDD, and AND gates ANDA, ANDB, ANDC and ANDD included in an integrated circuit 3200 are implemented. The first type of target standard cells included in the hatched elements INVB, ANDA, ANDB, NANDB and NANDC that are included in a data path most sensitive to the timing characteristic among a plurality of data paths associated with input data DIN and output data DOUT may be replaced with the second type of standard cells by step S2520 in FIG. 18. After then, the routing may be re-performed by step S2530 in FIG. 18 to complete the design of the integrated circuit 3200.

Although only the first type of standard cells are used in step S2410 of FIG. 16 and step S2510 of FIG. 18, exemplary embodiments of the inventive concept are not limited thereto. For example, the placement may be performed or the placement and routing may be performed using both the first type of standard cells and the second type of standard cells, and then the first type of target standard cells included in the clock network or the timing critical data path may be replaced with the second type of standard cells.

In an integrated circuit design, a method of generating the integrated circuit design, and a design system for generating the integrated circuit design according to exemplary embodiments, the integrated circuit design may be generated and implemented such that different types of standard cells are included in an integrated circuit design representing one integrated circuit. The different types of standard cells have the same functions but may differ in manufacturing method, performance, or area. Various different types of standard cells may be implemented in an integrated circuit design representing a single integrated circuit by using various design optimization schemes, and thus the integrated circuit having superior characteristics such as performance and area may be effectively designed and obtained.

An operation of using or applying different types of standard cells according to the requirements described with reference to FIG. 9, an operation of using or applying different types of standard cells according to the pin density described with reference to FIG. 10, an operation of being adjacent to the same type of standard cells to each other described with reference to FIG. 12, and an operation of inserting the filler cell described with reference to FIG. 14 may be used for design optimization in the placement process among the processes described with reference to FIG. 8. An operation of performing the placement change and performing the routing after the placement change described with reference to FIG. 16 may be used for design optimization in the clock tree synthesis process among the processes described with reference to FIG. 8. An operation of performing the placement change and re-performing the routing after the placement change described with reference to FIG. 18 may be used for design optimization in the timing optimization process among the processes described with reference to FIG. 8.

The integrated circuit may be designed to combine two or more of the various operations described above according to exemplary embodiments of the inventive concept. In addition, although exemplary embodiments are described where the various operations are performed in modules and/or tools for automatic placement and routing, exemplary embodiments are not limited thereto. For example, the various operations may also be pre-applied to a process for creating a Verilog netlist before performing the placement and routing (e.g., in a synthesis process).

Although exemplary embodiments are described that the first type of standard cells are manufactured using the single diffusion break method and the second type of standard cells are manufactured using the double diffusion break method, example embodiments are not limited thereto. For example, the first type and the second type may be changed according to example embodiments. In addition, although example embodiments are described that two different types of standard cells are placed or included in an integrated circuit design representing one integrated circuit, example embodiments are not limited thereto. For example, three or more different types of standard cells may be placed or included in an integrated circuit design representing one integrated circuit.

Figure 20:
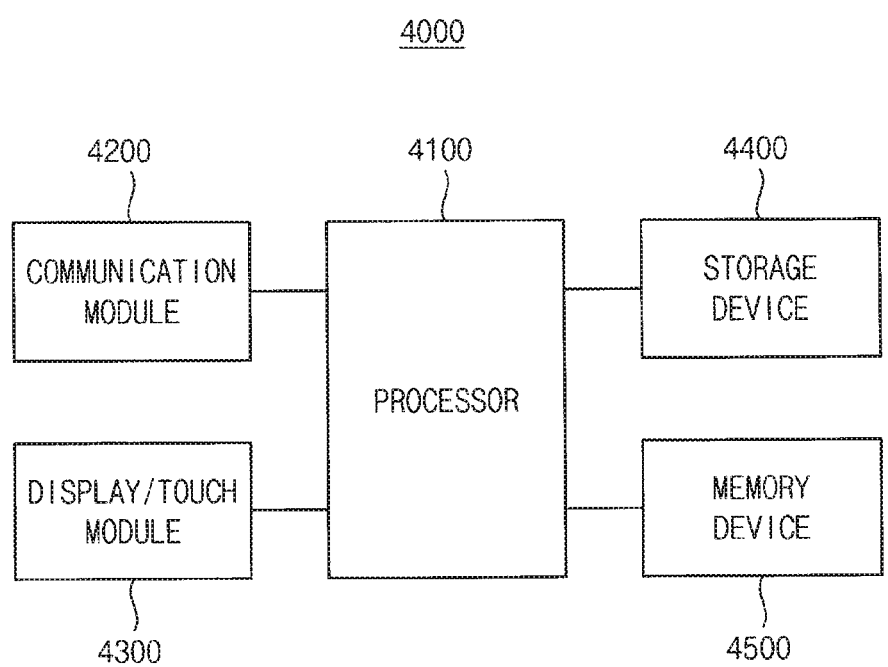
FIG. 20 is a block diagram illustrating an electronic system according to an exemplary embodiment of the inventive concept.

FIG. 20 is a block diagram illustrating an electronic system according to an exemplary embodiment oft the inventive concept.

Referring to FIG. 20, an electronic system 4000 includes at least one processor 4100, a communication module 4200, a display/touch module 4300, a storage device 4400, and a memory device 4500. For example, the electronic system 4000 may be any mobile system or any computing system.

The components of the electronic system 4000 may be designed and implemented to include different types of standard cells in an integrated circuit design representing one integrated circuit, as described above, and thus the electronic system 4000 may be implemented to have various improved characteristics such as improved performance or improved area, which are superior to those of a conventional electronic system.

The processor 4100 controls operations of the electronic system 4000. The processor 4100 may execute an operating system and at least one application to provide an internet browser, games, or videos. The communication module 4200 is implemented to perform wireless or wire communications with an external device. The communication module 4200 may include a transceiver to perform the communications. The display/touch module 4300 is implemented to display data processed by the processor 4100 and/or to receive data through a touch panel. The storage device 4400 is implemented to store user data, and is driven based on the method of operating the storage device according to exemplary embodiments. The memory device 4500 temporarily stores data used for processing operations of the electronic system 4000.

The inventive concept may be applied to designs of various electronic devices and electronic systems. For example, the inventive concept may be applied to devices and systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

Due to at least one of the above-described methods of generating an integrated circuit design (e.g., a layout), self-aligned double patterning can be used in combination with placement and routing schemes that perform placement of cells based on cell boundary. Thus, vertical alignment of such placed cells is now possible, and it is possible to place standard cells having the same function and different areas and/or performances in a single integrated circuit design. Accordingly, a more efficient integrated circuit may be generated from the generated integrated design.

The foregoing is illustrative of exemplary embodiments of the inventive concept and is not to be construed as limiting thereof. Although some exemplary embodiments have been described, those skilled in the art will readily appreciate that many modifications are possible in the exemplary embodiments without materially departing from the present disclosure.

Accordingly, all such modifications are intended to be included within the scope of the exemplary embodiments.

What is claimed is:

1. A method of generating an integrated circuit design, the method comprising:
receiving input data defining a plurality of input cells of the integrated circuit design;
selecting first standard cells from a first standard cell library to represent the input cells having a first characteristic, the first standard cell library including a first type of standard cells manufactured using a first diffusion break scheme;
selecting second standard cells from a second standard cell library to represent the input cells having a second characteristic different from the first characteristic, the second standard cell library including a second type of standard cells manufactured using a second diffusion break scheme, each of the second type of standard cells having a same function as a respective one of the first type of standard cells, the second diffusion break scheme being different from the first diffusion break scheme; and
generating output data representing the integrated circuit design by performing placement and routing on the selected first standard cells and the selected second standard cells,
wherein the generating of the output data representing the integrated circuit design further includes re-performing the placement and routing such that target standard cells among a plurality of standard cells placed in the integrated circuit design are physically adjacent to each other, the target standard cells corresponding to the second type of standard cells.

2. The method of claim 1, wherein a first standard cell of the first standard cells has a first function, the first standard cell includes a plurality of first wirings separated by a constant interval, and an outermost two of the plurality of first wirings are positioned to overlap a cell boundary of the first standard cell.

3. The method of claim 2, wherein a second standard cell of the second standard cells has the first function, the second standard cell includes a plurality of second wirings separated by the constant interval, and an outermost two of the plurality of second wirings are positioned not to overlap a cell boundary of the second standard cell.

4. The method of claim 3, wherein the first diffusion break scheme is a single diffusion break scheme, and the second diffusion break scheme is a double diffusion break scheme.

5. The method of claim 1, wherein the first characteristic indicates a pin density smaller than a reference density and the second characteristic indicates a pin density greater than or equal to the reference density.

6. The method of claim 1, wherein:
different types of standard cells are spaced apart from each other in a same row of the integrated circuit design by a distance greater than or equal to a predetermined reference distance, and
a same type of standard cells are arranged closer than the predetermined reference distance in the same row of the integrated circuit design.

7. The method of claim 1, wherein generating the output data further includes:
inserting a filler cell between different types of standard cells.

8. The method of claim 1, wherein generating the output data includes:
performing the placement using the first type of standard cells;
performing a placement change by replacing a target standard cell among a plurality of standard cells placed in the integrated circuit design with one of the second type of standard cells; and
performing the routing based on a result of the placement change.

9. The method of claim 8, wherein the target standard cell is a standard cell used in a clock network.

10. The method of claim 1, wherein generating the output data includes:
performing the placement and routing using the first type of standard cells;
performing a placement change by replacing a target standard cell among a plurality of standard cells placed in the integrated circuit design with one of the second type of standard cells; and
re-performing the routing based on a result of the placement change.

11. The method of claim 10, wherein the target standard cell is a standard cell used in a timing critical data path among a plurality of data paths.

12. The method of claim 1, the re-performing comprising exchanging a location of one of the target standard cells with a location of one of the first type of standard cells.

13. A design system for generating an integrated circuit design comprising:
a storage device configured to store a placer module and a router module; and
a processor configured to access the storage device to execute the modules,
wherein the placer module is configured to place at least one of a first type of standard cells from a first standard cell library and at least one of a second type of standard cells from a second standard cell library in the integrated circuit design based on input data representing input cells of the integrated circuit design, the first type of standard cells having a pin density smaller than a reference density and the second type of standard cells having a pin density greater than or equal to the reference density, the input data defining the integrated circuit design, the first type of standard cells manufactured using a first diffusion break scheme, the second type of standard cells manufactured using a second diffusion break scheme, each of the second type of standard cells having a same function as a respective one of the first type of standard cells, the second diffusion break scheme being different from the first diffusion break scheme, and
wherein the router module is configured to generate output data representing the integrated circuit design by routing connections of the at least one of the first type of standard cells and the at least one of the second type of standard cells placed in the integrated circuit design.

14. An integrated circuit design comprising:
a first type of standard cells configured to be manufactured using a first diffusion break scheme; and
a second type of standard cells configured to be manufactured using a second diffusion break scheme, each of the second type of standard cells having a same function as a respective one of the first type of standard cells, the second diffusion break scheme being different from the first diffusion break scheme,
wherein a first standard cell among the first type of standard cells has a first function and includes a plurality of first wirings, an outermost two of the plurality of first wirings are positioned to overlap a cell boundary of the first standard cell, and
wherein a second standard cell among the second type of standard cells has the first function and includes a plurality of second wirings, an outermost two of the plurality of second wirings are positioned not to overlap a cell boundary of the second standard cell.

15. The integrated circuit design of claim 14, wherein:
the plurality of first wirings in the first standard cell are separated by a first constant interval,
the plurality of second wirings in the second standard cell are separated by a second constant interval, and
the first constant interval and the second constant interval are same as each other.

16. The integrated circuit design of claim 14, wherein, when the first standard cell and the second standard cell are arranged adjacent to each other in different rows of the integrated circuit design, one of the plurality of first wirings and one of the plurality of second wirings are positioned on a same straight line.

17. The integrated circuit design of claim 14, wherein, when the first standard cell and the second standard cell are arranged adjacent to each other in a same row of the integrated circuit design, the first standard cell and the second standard cell are spaced apart from each other by a distance greater than or equal to a predetermined reference distance.

18. The integrated circuit design of claim 14, wherein an area of the second standard cell is larger than an area of the first standard cell.

19. The integrated circuit design of claim 14, wherein:
the first standard cell is placed to correspond to a plurality of first reference lines separated by a constant interval in the integrated circuit design,
the second standard cell is placed to correspond to a plurality of second reference lines separated by the constant interval in the integrated circuit design, and
each of the plurality of second reference lines is arranged between two adjacent first reference lines.

\* \* \* \* \*